United States Patent
Zhang et al.

(10) Patent No.: US 10,616,582 B2
(45) Date of Patent: Apr. 7, 2020

(54) MEMORY AND BANDWIDTH REDUCTION OF STORED DATA IN IMAGE/VIDEO CODING

(71) Applicant: QUALCOMM Incorporated, San Diego, CA (US)

(72) Inventors: Li Zhang, San Diego, CA (US); Jianle Chen, San Diego, CA (US); Xiang Li, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 75 days.

(21) Appl. No.: 15/719,424

(22) Filed: Sep. 28, 2017

(65) Prior Publication Data
US 2018/0098072 A1    Apr. 5, 2018

Related U.S. Application Data

(60) Provisional application No. 62/402,905, filed on Sep. 30, 2016.

(51) Int. Cl.
*H04N 7/12*    (2006.01)
*H04N 19/13*    (2014.01)
(Continued)

(52) U.S. Cl.
CPC ........... *H04N 19/13* (2014.11); *H04N 19/107* (2014.11); *H04N 19/117* (2014.11);
(Continued)

(58) Field of Classification Search
CPC ...... H04N 19/13; H04N 19/426; H04N 19/82; H04N 19/91; H04N 19/117; H04N 19/107;
(Continued)

(56) References Cited

U.S. PATENT DOCUMENTS

| 2006/0126743 A1* | 6/2006 | Takewaka ............. H03M 7/425 375/240.23 |
| 2013/0114675 A1* | 5/2013 | Guo .................... H04N 19/13 375/240.02 |

(Continued)

FOREIGN PATENT DOCUMENTS

WO    2009126911 A1    10/2009

OTHER PUBLICATIONS

Alshina E., et al., "CE1; subtest C4: Multi-parameter Probability Estimation for CABAC," 99. MPEG meeting, Mar. 2, 2012-Oct. 2, 2012, San Jose, (Motion Picture Expert Group or ISO/IEC JTC1/SC29/WG11), No. m22984, Feb. 1, 2012 (Feb. 1, 2012), XP030051509, 5 pages.

(Continued)

*Primary Examiner* — Richard T Torrente
(74) *Attorney, Agent, or Firm* — Shumaker & Sieffert, P.A.

(57) ABSTRACT

A device for processing video data stores one or more context statuses for a binary arithmetic coder at a bit depth of K; initializes an N-bit binary arithmetic coder with values for context variables for one of the one or more stored context statuses from previously coded blocks; codes the one or more blocks of the video data with the initialized N-bit binary arithmetic coder, wherein N and K are both positive integer values and K is smaller than N. A device for processing video data determines a set of one or more fixed filters with K-bit precision and determines a set of one or more derived filters with N-bit precision based on the set of one or more fixed filters with K-bit precision, wherein K and N are integers and K is less than N.

14 Claims, 14 Drawing Sheets

(51) Int. Cl.
| | |
|---|---|
| H04N 19/91 | (2014.01) |
| H04N 19/426 | (2014.01) |
| H04N 19/82 | (2014.01) |
| H04N 19/107 | (2014.01) |
| H04N 19/117 | (2014.01) |
| H04N 19/124 | (2014.01) |
| H04N 19/137 | (2014.01) |
| H04N 19/172 | (2014.01) |
| H04N 19/174 | (2014.01) |
| H04N 19/176 | (2014.01) |

(52) U.S. Cl.
CPC ......... *H04N 19/124* (2014.11); *H04N 19/137* (2014.11); *H04N 19/426* (2014.11); *H04N 19/82* (2014.11); *H04N 19/91* (2014.11); *H04N 19/172* (2014.11); *H04N 19/174* (2014.11); *H04N 19/176* (2014.11)

(58) Field of Classification Search
CPC .. H04N 19/137; H04N 19/124; H04N 19/176; H04N 19/172; H04N 19/174
See application file for complete search history.

(56) References Cited

U.S. PATENT DOCUMENTS

| | | | |
|---|---|---|---|
| 2014/0056365 | A1 | 2/2014 | Huang et al. |
| 2016/0286229 | A1 | 9/2016 | Li et al. |
| 2016/0286230 | A1 | 9/2016 | Li et al. |
| 2016/0286232 | A1 | 9/2016 | Li et al. |
| 2016/0353111 | A1 | 12/2016 | Zhang et al. |
| 2016/0353112 | A1 | 12/2016 | Zhang et al. |
| 2016/0353113 | A1 | 12/2016 | Zhang et al. |
| 2017/0237981 | A1 | 8/2017 | Karczewicz et al. |
| 2017/0237982 | A1 | 8/2017 | Karczewicz et al. |
| 2017/0238020 | A1 | 8/2017 | Karczewicz et al. |

OTHER PUBLICATIONS

Chapter II Demand and Response to Written Opinion from International Application No. PCT/US2017/054451, dated Jul. 19, 2018, 24 pp.
International Preliminary Report on Patentability from International Application No. PCT/US2017/054451, dated Jan. 15, 2019, 24 pp.
International Search Report and Written Opinion—PCT/US2017/054451—ISA/EPO—dated Mar. 12, 2018.
Karczewicz M., et al., "Improvements on Adaptive Loop Filter," Joint Video Exploration Team (JVET) of ITU-T SG 16 WP 3 and ISO/IEC JTC 1/SC 29/WG 11, Document: JVET-B0060-v2, 2nd Meeting: San Diego, USA, Feb. 20-26, 2016, XP030150068, URL: http://PHENIX.INT-EVRY.FR/JVET/., No. JVET-B0060, 6 pages.
Partial International Search Report—PCT/US2017/054451—ISA/EPO—dated Dec. 20, 2017.
Second Written Opinion from International Application No. PCT/US2017/054451, dated Oct. 15, 2018, 10 pp.
Vatis Y., et al., "Coding of Coefficients of Two-Dimensional Non-Separable Adaptive Wiener Interpolation Filter," Proceeding of the SPIE—The International Society for Optical Engineering, SPIE, PO Box 10 Bellingham WA 98227-0010 USA, vol. 5960, Jul. 12, 2005, pp. 623-631, XP002419200, DOI: 10.1117/12.632494, ISBN: 978-1-62841-730-2.
ITU-T H.265, Series H: Audiovisual and Multimedia Systems, Infrastructure of audiovisual services—Coding of moving video, Advanced video coding for generic audiovisual services, the International Telecommunication Union. Dec. 2015, 664 pp.
Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.
Chen J., et al., "Algorithm description of Joint Exploration Test Model 3 (JEM3)", 3. JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/ No. JVET-C1001, Jul. 2, 2016 (Jul. 2, 2016), XP030150223, 38 pages.
Alshin, et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F254, 7 pp.
Ashin et al., "CE1 (subset B): Multi-parameter probability up-date for CABAC", Nov. 21-30, 2011; (Joint Collaborative Team on Video Coding (JCT-VC) of ITU-T SG16 WP3 and ISO/IEC JTC1/SC29/WG11), doc. No. JCTVC-G764, 7th Meeting: Geneva, Nov. 18, 2011; 4 pp.
Karczewicz M., et al., "EE2.5: Improvements on adaptive loop filter," Joint Video Exploration Team (JVET) of ITU-T SG 16 WP 3 and ISO/IEC JTC 1/SC 29/WG 11, 3rd Meeting: Geneva, CH, Document: JVET-O0038, May 26-Jun. 1, 2016, pp. 1-4.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
Marpe D., et al., "Context-Based Adaptive Binary Arithmetic Coding in the H.264AVC Video Compression Standard", IEEE Transaction on Circuits and Systems for Video Technology, IEEE Service Center, Piscataway, NJ, US, vol. 13, No. 7, Jul. 1, 2003, pp. 620-636.
Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526, the whole document.

* cited by examiner

MEMORY AND BANDWIDTH REDUCTION OF STORED DATA IN IMAGE/VIDEO CODING

This application claims the benefit of U.S. Provisional Patent Application 62/402,905, filed 30 Sep. 2016, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques that may reduce the memory and bandwidth associated with storing data in an image/video coding process. The techniques of this disclosure may be particularly applicable to the storing of context statuses, fixed filters for adaptive loop filter processes, motion information, or other video coding information. The techniques of this disclosure may be used in conjunction with any of the existing video codecs, such as HEVC (High Efficiency Video Coding), or may be an efficient coding tool for use in a future video coding standard, such as the H.266 standard presently under development and extensions thereof.

According to one example, a method for processing video data includes storing one or more context statuses for a binary arithmetic coder at a bit depth of K, wherein each context status of the one or more context statuses comprises values for context variables, and wherein the one or more context statuses are associated with one or more previously coded blocks; initializing an N-bit binary arithmetic coder with values for context variables for one of the one or more stored context statuses; coding the one or more blocks of the video data with the initialized N-bit binary arithmetic coder, wherein N and K are both positive integer values, and wherein K is smaller than N; and outputting the one or more coded blocks.

According to another example, a device for processing video data includes a memory configured to store the video data and one or more processors configured to store one or more context statuses for a binary arithmetic coder at a bit depth of K, wherein each context status of the one or more context statuses comprises values for context variables, and wherein the one or more context statuses are associated with one or more previously coded blocks of the video data; initialize an N-bit binary arithmetic coder with values for context variables for one of the one or more stored context statuses; code the one or more blocks of the video data with the initialized N-bit binary arithmetic coder, wherein N and K are both positive integer values, and wherein K is smaller than N; and output the one or more coded blocks.

According to another example, a method for processing video data includes determining a set of one or more fixed filters with K-bit precision; determining a set of one or more derived filters with N-bit precision based on the set of one or more fixed filters with K-bit precision, wherein K and N are integers and K is less than N; filtering a block of video data using a filter from the set of one or more derived filters with N-bit precision; and outputting the filtered block of video data.

According to another example, a device for processing video data includes a memory configured to store the video data and one or more processors configured to determine a set of one or more fixed filters with K-bit precision; determine a set of one or more derived filters with N-bit precision based on the set of one or more fixed filters with K-bit precision, wherein K and N are integers and K is less than N; filter a block of video data using a filter from the set of one or more derived filters with N-bit precision; and output the filtered block of video data.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIGS. 5A-5C show examples of adaptive loop filter (ALF) filter supports.

FIG. 9 shows an example of spatial-temporal motion vector prediction (STMVP).

DETAILED DESCRIPTION

This disclosure describes techniques that may reduce the bandwidth needed for transmitting encoded video data and may also reduce the amount of memory needed for storing video during data during encoding and decoding. The techniques of this disclosure may be particularly applicable to the storing of context statuses, fixed filters in adaptive loop filter processes, and motion information. The techniques of this disclosure may be used in conjunction with any of the existing video codecs, such as the High Efficiency Video Coding (HEVC) standard, or may be an efficient coding tool for use in a future video coding standard, such as the so-called H.266 standard and extensions thereof.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current block, current picture, etc. In the context of this disclosure, the term current is intended to identify a block or picture that is currently being coded, as opposed to, for example, previously or already coded block or picture, or a yet to be coded block or picture.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Figure 1:
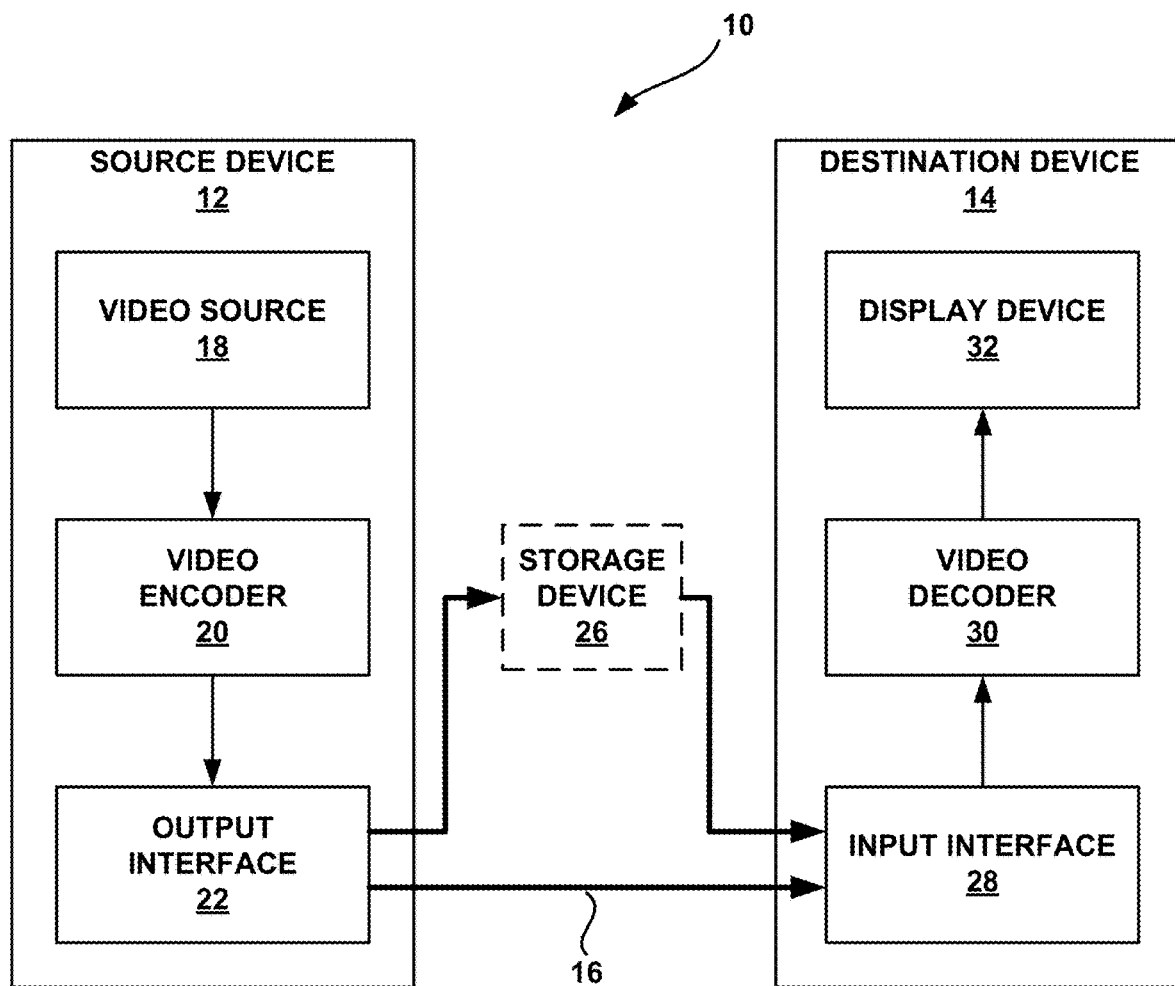
FIG. 1 is a block diagram illustrating an example video encoding and decoding system configured to perform the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Although not shown in FIG. 1, in some examples, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 and video decoder 30 may operate according to a video compression standard, such as the recently finalized HEVC standard. Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 may also be referred to as JVET-C1001 and is incorporated herein by reference.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RB SP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Various aspects of HEVC will now be described. Similar to the temporal scalability feature in the H.264/MPEG-4 AVC SVC extension, HEVC specifies a temporal identifier in the NAL unit header, which indicates a level in a hierarchical temporal prediction structure. This was introduced to achieve temporal scalability without the need to parse parts of the bitstream other than the NAL unit header.

As introduced above, in HEVC, the largest coding unit in a slice is called a CTU. A CTU contains a quad-tree, the nodes of which are CUs. The size of a CTU can range from 16×16 to 64×64 in the HEVC main profile (although technically 8×8 CTU sizes can also be supported). A CU may be the same size as a CTU, although a CU may also be as small as 8×8. Each CU is coded with one mode. When a CU is inter mode coded, the CU may correspond to a PU without partitioning or may be further partitioned into 2 or 4 PUs. When two PUs are present in one CU, the two PUs can be half size rectangles or two rectangle size with ¼ or ¾ size of the CU. When a CU is inter coded, one set of motion information is present for each PU. Additionally, each PU is coded with a unique inter-prediction mode to derive the set of motion information.

CABAC was first introduced in H.264/AVC and is now used in HEVC. Both video encoder 20 and video decoder 30 may perform CABAC coding. Aspects of CABAC are described in D. Marpe, H. Schwarz, and T. Wiegand, "Context-based adaptive binary arithmetic coding in the H.264/AVC video compression standard," IEEE Trans. Circuits Syst. Video Technol., vol. 13, no. 7, pp. 620-636, July 2003, which is hereby incorporated by reference. CABAC involves three main functions: binarization, context modeling, and arithmetic coding. Binarization maps syntax elements to binary symbols (bins) which are called bin strings. Context modeling estimates the probability of the bins. Finally, binary arithmetic coder compresses the bins to bits based on the estimated probability. Several different binarization processes are used in HEVC, including unary (U), truncated unary (TU), kth-order Exp-Golomb (EGk), and fixed length (FL). Additional details can be found in V. Sze and M. Budagavi, "High throughput CABAC entropy coding in HEVC," IEEE Transactions on Circuits and Systems for Video Technology (TCSVT), vol. 22, no. 12, pp. 1778-1791, December 2012, which is hereby incorporated by reference.

Context modeling provides accurate probability estimation which is necessary to achieve high coding efficiency. Accordingly, the context modeling may be highly adaptive. Different context models can be used for different bins where the probability of the context models is updated based on the values of previously coded bins. Bins with similar distributions often share the same context model. The context model for each bin can be selected based on the type of syntax element, bin position in syntax element (binIdx), luma/chroma, neighboring information, etc.

Context switch occurs after each bin coding. The probability models may be stored as 7-bit entries (e.g., 6 bits for the probability state and 1 bit for the most probable symbol (MPS)) in context memory and addressed using the context index computed by context selection logic. HEVC uses the same probability update method as H.264/AVC. However, the context selection logic has been modified to improve throughput.

CABAC utilizes probability representation. For CABAC, 64 representative probability values $p_\sigma \in [0.01875, 0.5]$ can be derived for the LPS (least probable symbol) by the following recursive equation:

$$p_\sigma = \alpha * p_{\sigma-1} \text{ for all } \sigma = 1, \ldots, 63 \qquad (1)$$

$$\text{with } \alpha = \left(\frac{0.01875}{0.5}\right)^{1/63}$$

Here, both the chosen scaling factor $\alpha \approx 0.9492$ and the cardinality N=64 of the set of probabilities represent an acceptable compromise between the accuracy of probability representation and the desire for fast adaptation. The probability of the MPS (most probable symbol, i.e., 1-LPS) is equal to 1 minus the probability of LPS. Therefore, the probability range that could be represented by CABAC is [0.01875, 0.98125 (=1−0.01875)].

CABAC also involves an initialization process. Before coding one slice, the probability models are initialized based on some pre-defined values. For example, given an input quantization parameter denoted by qp and the pre-defined value denoted by initVal, the 7-bit entry of the probability model (denoted by state and MPS) could be derived as follows:

$qp$=Clip3(0,51,$qp$);

slope=(initVal>>4)*5−45;

offset=((initVal &15)<<3)−16;

initState=min(max(1,(((slope*$qp$)>>4)+offset)),126);

MPS=(initState>=64);

state index=((mpState? (initState−64):(63−initState))
    <<1)+MPS;  (2)

Note that the derived state index implicitly includes the MPS information, i.e., when the state index is an even value, the MPS value is equal to 0; otherwise, when the state index is an odd value, the MPS value is equal to 1. initVal is in a range of [0, 255] with 8-bit precision.

Note that the pre-defined initVal is slice-dependent, i.e., three sets of context initialization parameters for those probability models specifically used in I, P and B slices, respectively. In this way, the encoder is enabled to choose for these slice types between three initialization tables such that a better fit to different coding scenarios and/or different types of video content can be achieved.

In HEVC, another tool could be applied to allow one P (or B) slice to be initialized with B (or P) slices. The related syntax elements, semantics and decoding process are described as follows:
Syntax
7.3.6 Slice Segment Header Syntax
7.3.6.1 General Slice Segment Header Syntax

| | Descriptor |
|---|---|
| slice_segment_header( ) { | |
|   first_slice_segment_in_pic_flag | u(1) |
| ... | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
| ... | |
|     if( lists_modification_present_flag && | |
|     NumPocTotalCurr > 1 ) | |
|       ref_pic_lists_modification( ) | |
|     if( slice_type = = B ) | |
|       mvd_l1_zero_flag | u(1) |
|     if( cabac_init_present_flag ) | |
|       cabac_init_flag | u(1) |
|     if( slice_temporal_mvp_enabled_flag ) { | |
|       if( slice_type = = B ) | |
|         collocated_from_l0_flag | u(1) |
|     } | |
|   ... | |
|   byte_alignment( ) | |
| } | |

Aspects of the semantics introduced above will now be described. The syntax element cabac_init_present_flag equal to 1 specifies that cabac_init_flag is present in slice headers referring to the PPS. cabac_init_present_flag equal to 0 specifies that cabac_init_flag is not present in slice headers referring to the PPS. The syntax element cabac_init_flag specifies the method for determining the initialization table used in the initialization process for context variables, as defined in the decoding process described below. The value of cabac_init_flag is inferred to be equal to 0 when cabac_init_flag is not present.

Aspects of the decoding process introduced above will now be described. In Table 9-4, the ctxIdx for which initialization is needed for each of the three initialization types, specified by the variable initType, are listed. Also listed is the table number that includes the values of init-Value needed for the initialization. For P and B slice types, the derivation of initType depends on the value of the cabac_init_flag syntax element. The variable initType is derived as follows:

```
if( slice_type = = I )
    initType = 0
else if( slice_type = = P )
    initType = cabac_init_flag ? 2 : 1          (9-7)
else
    initType = cabac_init_flag ? 1 : 2
```

A probability updating process will now be described. For a given probability state, the update depends on the state index and the value of the encoded symbol identified either as a LPS or a MPS. As a result of the updating process, a new probability state is derived, which consists of a potentially modified LPS probability estimate and, if necessary, a modified MPS value. Basically, the derivation of the transition rules for the LPS probability is based on the following relation between a given LPS probability $p_{old}$ and its updated counterpart $p_{new}$:

$$p_{new} = \begin{cases} \max(\alpha * p_{old}, p_{62}), & \text{if a } MPS \text{ occurs} \\ \alpha * p_{old} + (1 - \alpha), & \text{if a } LPS \text{ occurs} \end{cases} \quad (3)$$

To reduce the complexity, in CABAC, all transition rules can be realized by at most two tables each having 128 entries of 7-bit unsigned integer values. Given a state index i, the new state index after updating is defined as TransIdxMPS[ i ] when a MPS values is coded, or TransIdxLPS[i] when a LPS values is coded.

```
TransIdxMPS[ 128 ] =
{
 2, 3, 4, 5, 6, 7, 8, 9, 10, 11, 12, 13, 14, 15, 16, 17,
 18, 19, 20, 21, 22, 23, 24, 25, 26, 27, 28, 29, 30, 31, 32, 33,
 34, 35, 36, 37, 38, 39, 40, 41, 42, 43, 44, 45, 46, 47, 48, 49,
 50, 51, 52, 53, 54, 55, 56, 57, 58, 59, 60, 61, 62, 63, 64, 65,
 66, 67, 68, 69, 70, 71, 72, 73, 74, 75, 76, 77, 78, 79, 80, 81,
 82, 83, 84, 85, 86, 87, 88, 89, 90, 91, 92, 93, 94, 95, 96, 97,
 98, 99, 100, 101, 102, 103, 104, 105, 106, 107, 108, 109, 110, 111,
 112, 113,
 114, 115, 116, 117, 118, 119, 120, 121, 122, 123, 124, 125, 124, 125,
 126, 127
};
TransIdxLPS[ 128 ] =
{
 1, 0, 0, 1, 2, 3, 4, 5, 4, 5, 8, 9, 8, 9, 10, 11,
 12, 13, 14, 15, 16, 17, 18, 19, 18, 19, 22, 23, 22, 23, 24, 25,
 26, 27, 26, 27, 30, 31, 30, 31, 32, 33, 32, 33, 36, 37, 36, 37,
 38, 39, 38, 39, 42, 43, 42, 43, 44, 45, 44, 45, 46, 47, 48, 49,
 48, 49, 50, 51, 52, 53, 52, 53, 54, 55, 54, 55, 56, 57, 58, 59,
 58, 59, 60, 61, 60, 61, 60, 61, 62, 63, 64, 65, 64, 65, 66, 67,
 66, 67, 66, 67, 68, 69, 68, 69, 70, 71, 70, 71, 70, 71, 72, 73,
 72, 73, 72, 73, 74, 75, 74, 75, 74, 75, 76, 77, 76, 77, 126, 127
};
```

Aspects of a binary arithmetic coder, like the binary arithmetic coders in video encoder 20 and video decoder 30, will now be introduced. Arithmetic coding is based on recursive interval division. In a conventional arithmetic coder, a range, with an initial value of 0 to 1, is divided into two subintervals based on the probability of the bin. The encoded bits provide an offset that, when converted to a binary fraction, selects one of the two subintervals, which indicates the value of the decoded bin. After every decoded bin, the range is updated to equal the selected subinterval, and the interval division process repeats itself. The range and offset have limited bit precision, so renormalization is required whenever the range falls below a certain value to prevent underflow. Renormalization can occur after each bin is decoded.

Arithmetic coding can be done using an estimated probability (context coded) (which is called regular coding mode), or assuming equal probability of 0.5 (bypass coded, which is called bypass mode). For bypass coded bins, the division of the range into subintervals can be done by a shift, whereas a look up table is required for the context coded bins. HEVC uses the same arithmetic coding as H.264/AVC.

Figure 2:
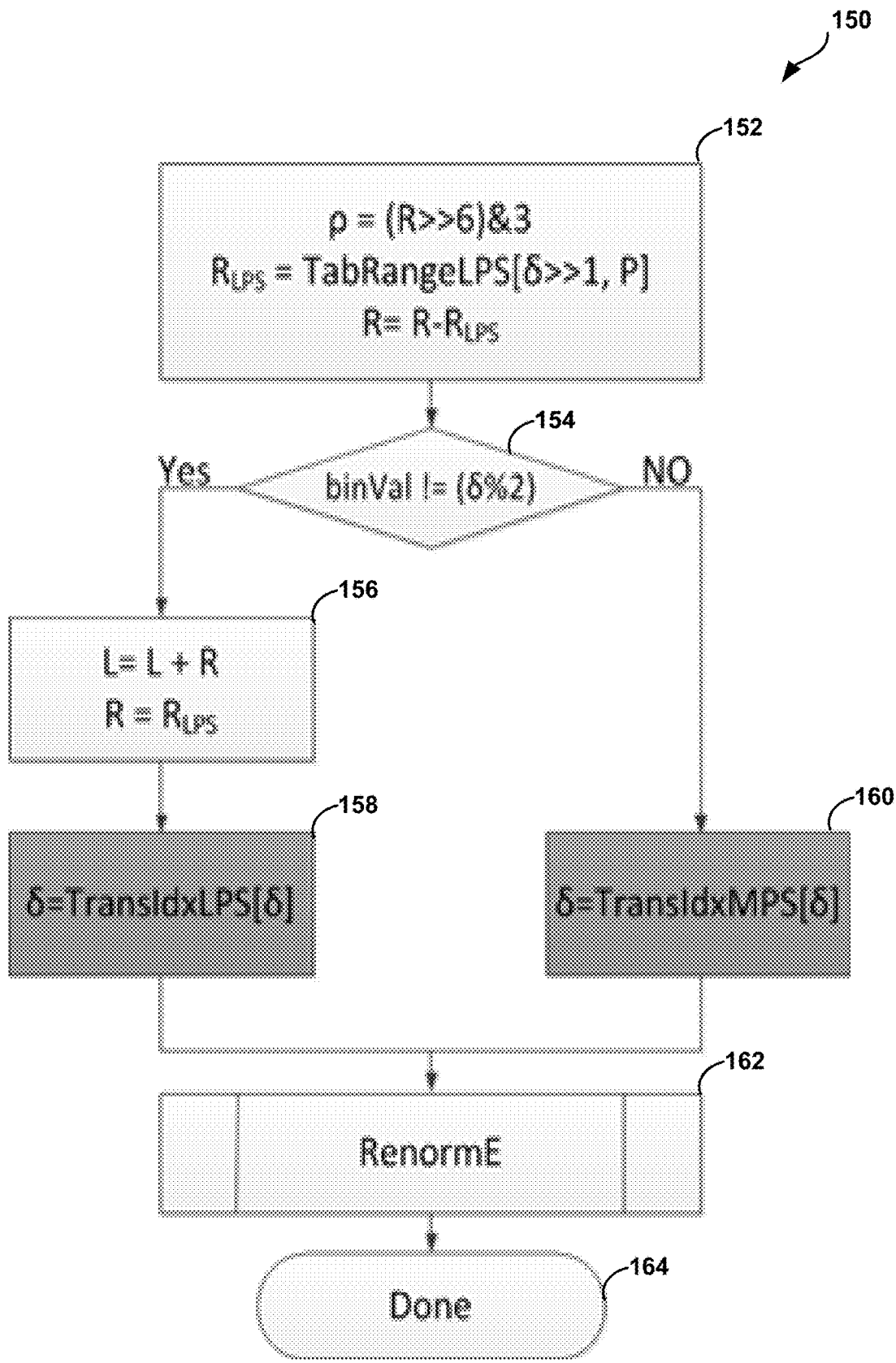
FIG. 2 shows an example flow diagram of a binary arithmetic encoding process.

In HEVC or H.264/AVC, the Table-Based Binary Arithmetic Coding is employed and the flow of regular coding mode is introduced in details in the following paragraphs. FIG. 2 shows an example flow diagram of the binary arithmetic encoding process including the updating process of probability estimation (in gray shaded boxes) for a single bin value (binVal) using the regular coding mode.

FIG. 2 is a flowchart illustrating an example process 150 for table-based binary arithmetic coding. That is, FIG. 2 illustrates the binary arithmetic encoding process including the updating process of probability estimation (in gray shaded boxes for steps 158 and 160) for a single bin value (binVal) using regular coding mode. In particular, process 150 of FIG. 2 illustrates a binary arithmetic encoding process for a given bin value binVal using the regular coding mode. The internal state of the arithmetic encoding engine is characterized by two quantities: the current interval range R and the base (lower endpoint) L of the current code interval. However, the precision needed to store these registers in a CABAC engine (both in regular and bypass mode) can be reduced up to 9 and 10 bits, respectively. Encoding of the given binary value binVal observed in a context with probability state index δ and value of MPS (δ%2) is performed in a sequence of four elementary steps as described below. Video encoder 20 and video decoder 30 may, for example, be configured to perform process of FIG. 2.

Process 150 may begin at step 152, at which the video coding device subdivides a current interval according to the given probability estimates. This interval subdivision process involves three elementary operations as shown at step 152 of process 150. First, the current interval range R is approximated by a quantized value Q(R) using an equi-partition of the whole range $2^8 \leq R \leq 2^9$ into four cells. But instead of using the corresponding representative quantized range values $Q_0$, $Q_1$, $Q_2$, and $Q_3$ explicitly in the CABAC engine, is only addressed by its quantizer index ρ, which can be efficiently computed by a combination of a shift and bit-masking operation, i.e.:

$$\rho = (R>>6)\&3 \quad (4)$$

Then, this index ρ and the probability state index δ are used as entries in a 2-D table TabRangeLPS to determine the (approximate) LPS related subinterval range $R_{LPS}$, as shown in FIG. 2. Here, the table TabRangeLPS contains all 64×4 pre-computed product values for $p_\sigma \cdot Q_\rho$ for $0 \leq (\delta>>1) \leq 63$ and $0 \leq \rho \leq 3$ in 8-bit precision. Given the dual subinterval range for the MPS, the subinterval corresponding to the given bin value binVal is chosen in decision block 94 of process 150. If binVal is equal to the MPS value (NO branch of decision block 154), the video coding device may choose the lower subinterval, so that L is unchanged. Otherwise (YES branch of decision block 154), the video coding device may select the upper subinterval with range equal to $R_{LPS}$ (156).

At steps 158 and 160 process 90 the update of the probability states is performed as described in ITU-T H.264, § 1.2.2.2 (illustrated using gray shaded boxes). Step 162 consists of the renormalization of the registers L and R ("RenormE" box in FIG. 2). Step 164 represents the end of process 150.

The 2-D table TabRangeLPS is defined as follows:

TabRangeLPS[64][4] =
{
 { 128, 176, 208, 240},
 { 128, 167, 197, 227},
 { 128, 158, 187, 216},
 { 123, 150, 178, 205},
 { 116, 142, 169, 195},
 { 111, 135, 160, 185},
 { 105, 128, 152, 175},
 { 100, 122, 144, 166},
 { 95, 116, 137, 158},
 { 90, 110, 130, 150},
 { 85, 104, 123, 142},
 { 81, 99, 117, 135},
 { 77, 94, 111, 128},
 { 73, 89, 105, 122},
 { 69, 85, 100, 116},
 { 66, 80, 95, 110},
 { 62, 76, 90, 104},
 { 59, 72, 86, 99},
 { 56, 69, 81, 94},
 { 53, 65, 77, 89},
 { 51, 62, 73, 85},
 { 48, 59, 69, 80},
 { 46, 56, 66, 76},
 { 43, 53, 63, 72},
 { 41, 50, 59, 69},
 { 39, 48, 56, 65},
 { 37, 45, 54, 62},
 { 35, 43, 51, 59},
 { 33, 41, 48, 56},
 { 32, 39, 46, 53},
 { 30, 37, 43, 50},
 { 29, 35, 41, 48},
 { 27, 33, 39, 45},
 { 26, 31, 37, 43},
 { 24, 30, 35, 41},
 { 23, 28, 33, 39},
 { 22, 27, 32, 37},
 { 21, 26, 30, 35},
 { 20, 24, 29, 33},
 { 19, 23, 27, 31},
 { 18, 22, 26, 30},
 { 17, 21, 25, 28},
 { 16, 20, 23, 27},
 { 15, 19, 22, 25},
 { 14, 18, 21, 24},
 { 14, 17, 20, 23},
 { 13, 16, 19, 22},
 { 12, 15, 18, 21},
 { 12, 14, 17, 20},
 { 11, 14, 16, 19},
 { 11, 13, 15, 18},
 { 10, 12, 15, 17},
 { 10, 12, 14, 16},
 { 9, 11, 13, 15},
 { 9, 11, 12, 14},
 { 8, 10, 12, 14},
 { 8, 9, 11, 13},
 { 7, 9, 11, 12},
 { 7, 9, 10, 12},
 { 7, 8, 10, 11},
 { 6, 8, 9, 11},
 { 6, 7, 9, 10},
 { 6, 7, 8, 9},
 { 2, 2, 2, 2}
};

Aspects of the decoding process are described in more detail at section 9.3.4.3.2.2 of the HEVC specification.

A high-precision binary arithmetic coder for JEM will now be discussed. Video encoder 20 and video decoder 30 may be configured to implement such a high-precision binary arithmetic coder. In JCTVC-F254 (Alexander Alshin, Elena Alshina, "Multi-parameter probability up-date for CABAC", JCTVC-F254, 6th Meeting: Torino, ITA, July 2011, incorporated herein by reference) and JCTV-G764 (Alexander Alshin, Elena Alshina, JeongHoon Park, "CE1 (subset B): Multi-parameter probability up-date for CABAC", JCTVC-G764, 7th Meeting: Geneva, CH, 21-30 November, 2011, incorporated herein by reference), a new arithmetic coder was proposed. In the proposed implementation, every probability is represented as integer number from 1 to 32767. So all calculations are carried out with 16-bit precision. Instead of look-up tables (TransIdxMPS and TransIdxLPS) and exponential mesh for probability, which are utilized in AVC CABAC, uniform mesh and explicit calculation with multiplication free formula for probability update are used in JCTVC-F254 and JCTV-G764.

For example, suppose that probability $p_i$ is represented by the probability index, which is an integer number $P_i$ from 0 to $2^k$ (with k equal to 15 for example), that is $$p_i = P_i/2^k \tag{5}$$

Following the most frequently used following formula for the probability update in modern arithmetic codecs (see, e.g., Marpe cited above):

$$p_{new} = \alpha y + (1-\alpha) p_{old}. \tag{6}$$

Here y is equal to "zero" if current symbol matches with most probable symbol (MPS) otherwise y is equal to "one". This formula provides estimating value for probability of least probable symbol (LPS). The parameter $N=1/\alpha$ is a measure for number of previously encoded bins which have significant influence to the current up-date ("window size").

If assumed that $\alpha$ is power of two ($\alpha=\frac{1}{2}^M$, M is a positive integer), and given the pi in equation (5) as the input $p_{old}$, then the updated probability index could be rewritten as:

$$P_i = ((2^k) >> M) + P_i - (P_i >> M) \tag{7}$$

Various aspects of a two-probabilities update model will now be described. The main idea of the proposed technique is to use several probability estimations (instead of only one) with different a and combine them as weighted average for next bin probability prediction.

$$p_{i\ new} = \alpha_i y + (1-\alpha_i) p_{i\ old} \tag{9}$$

$$p_{new} = \Sigma \beta_i p_{i\ new}. \tag{10}$$

Calculations in formula (9) for each probabilities $p_i$ are independent.

In the proposed method, the linear combination for probability estimation consists of two summands corresponding $N_0=16$ and $N_1=256$ ($N_i=1/\alpha_i$):

$$P_0 = (Y>>4) + P_0 - (P_0>>4) \tag{11}$$

$$P_1 = (Y>>8) + P_1 - (P_0>>8) \tag{12}$$

$$P = (P_0 + P_1 + 1) >> 1 \tag{13}$$

Here $Y=2^{15}$ if last coding bin is "1" and Y=0 if last coding bin is "0", ">>M" is right arithmetic shift for M bits.

Figure 3:
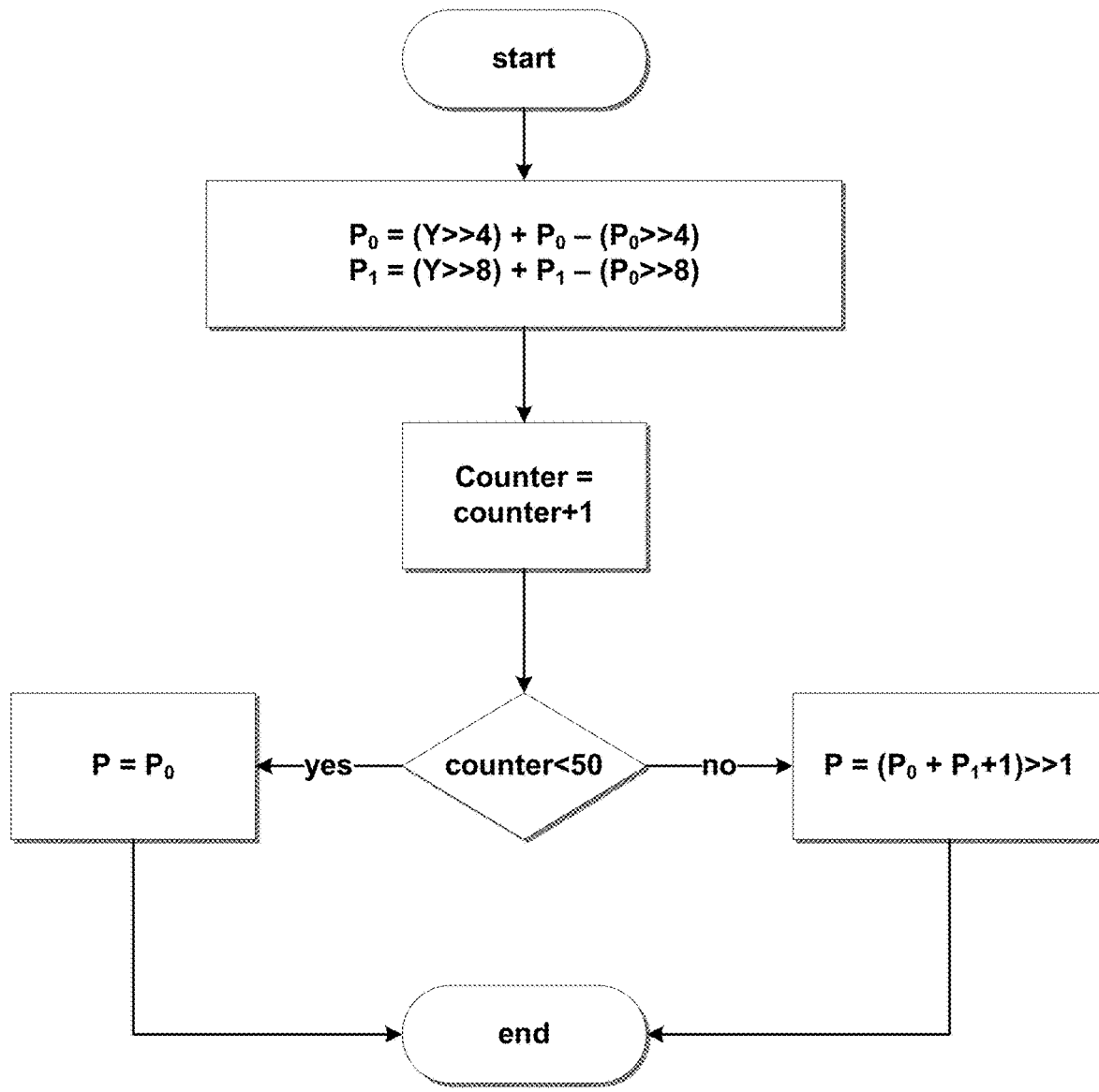
FIG. 3 shows an example of a multi-parameter probability up-date diagram.

FIG. 3 shows an example of a multi-parameter probability update diagram (with two probabilities model). The range calculation process may, for example, be performed with a 512×64 lookup table.

Aspects of context initialization will now be described. A different context initialization method may be applied. Two-parameters (denoted by asCtxInit[0] and asCtxInit[1], respectively) are pre-defined for one context model.
    Int iQPreper=I slice? 37:40;
    Int c=asCtxInit[0]+asCtxInit[1]*(iQp−iQPreper);
    iP0=min(max(1, c), 32767);
For a one-probability update model, the context model is represented by iP0 with 15-bit precision. For a two-probability update model, another variable iP1 is firstly set equal to iP0 and the counter of how many bins have been coded are further required. In the proposal, both asCtxInit[0] and asCtxInit[1] are stored in 16-bit.

Context initialization in JEM will now be discussed. Context initialization in JEM relies on initialization from pre-defined tables. As described in U.S. patent application Ser. Nos. 15/166,044 and 15/166,068, both filed 26 May 2016, the 8-bit initialization method in HEVC could be reused even under the 15/16-bit arithmetic coder. Newly added parts compared to HEVC design are highlighted in bold and newly removed parts are shown in [[brackets]].

The probability models are initialized based on some pre-defined values, as done in HEVC. For example, given an input quantization parameter denoted by qp and the pre-defined value denoted by initVal, the 15-bit entry of the probability model (denoted by state) could be derived as follows:
    qp=Clip3(0, 51, qp);
    slope=(initVal>>4)*5−45;
    offset=((initVal &15)<<3)−16;
    initState=min(max(1, (((slope*qp)>>4)+offset)), 126);
    [[MPS=(initState>=64);
    state index=((mpState? (initState−64):(63−initState))<<1)+MPS;]]
    state index = m_MappedProb[initState];
    m_ucWdow = ALPHA0;
    wherein m_MappedProb[128] =
    {
      614, 647, 681, 718, 756, 797, 839, 884, 932, 982, 1034, 1089, 1148, 1209, 1274, 1342,
      1414, 1490, 1569, 1653, 1742, 1835, 1933, 2037, 2146, 2261, 2382, 2509, 2643, 2785, 2934, 3091,
      3256, 3430, 3614, 3807, 4011, 4225, 4452, 4690, 4941, 5205, 5483, 5777, 6086, 6412, 6755, 7116,
      7497, 7898, 8320, 8766, 9235,
    9729,10249,10798,11375,11984,12625,13300,14012,14762,15551,16384,
    16384,17216,18005,18755,19467,20142,20783,21392,21969,22518,23038,23532,24001,24447,24869,25270,
    25651,26012,26355,26681,26990,27284,27562,27826,28077,28315,28542,28756,28960,29153,29337,29511,
    29676,29833,29982,30124,30258,30385,30506,30621,30730,30834,30932,31025,31114,31198,31277,31353,
    31425,31493,31558,31619,31678,31733,31785,31835,31883,31928,31970,32011,32049,32086,32120,32153,
    };

In one example, ALPHA0 denotes the index of the default window size. The window size associated with the i-th context model $W_i$ is equal to (1<<ALPHA0). For example, if the default window size is equal to 64, ALPHA0 is equal to 6.

In another example, when the bit precision of the arithmetic coder is equal to K, the entry of the above table, i.e., m_MappedProb[128], may be defined as: m_MappedProb[i]=Ceil($2^K$*prob[i]). In another example, m_MappedProb[i]=Ceil ($2^K$*prob[i]+0.5). Here, the function Ceil (x) denotes the smallest integer greater than or equal to x, and i indicates the probability index, i.e., initState used in HEVC. The array prob[128] represent the 128 possible probabilities of symbol '1' used by HEVC.

```
Prob[128] = {
0.018750, 0.019753, 0.020810, 0.021923, 0.023096, 0.024332, 0.025633,
0.027005,
0.028450, 0.029972, 0.031575, 0.033264, 0.035044, 0.036919, 0.038894,
0.040975,
0.043167, 0.045476, 0.047909, 0.050473, 0.053173, 0.056018, 0.059014,
0.062172,
0.065498, 0.069002, 0.072694, 0.076583, 0.080680, 0.084996, 0.089543,
0.094334,
0.099381, 0.104698, 0.110299, 0.116200, 0.122417, 0.128966, 0.135866,
0.143134,
0.150792, 0.158859, 0.167358, 0.176312, 0.185744, 0.195682, 0.206151,
0.217180,
0.228799, 0.241039, 0.253935, 0.267520, 0.281833, 0.296911, 0.312795,
0.329530,
0.347159, 0.365732, 0.385299, 0.405912, 0.427629, 0.450507, 0.474609,
0.500000,
0.500000, 0.525391, 0.549493, 0.572371, 0.594088, 0.614701, 0.634268,
0.652841,
0.670470, 0.687205, 0.703089, 0.718167, 0.732480, 0.746065, 0.758961,
0.771201,
0.782820, 0.793849, 0.804318, 0.814256, 0.823688, 0.832642, 0.841141,
0.849208,
0.856866, 0.864134, 0.871034, 0.877583, 0.883800, 0.889701, 0.895302,
0.900619,
0.905666, 0.910457, 0.915004, 0.919320, 0.923417, 0.927306, 0.930998,
0.934502,
0.937828, 0.940986, 0.943982, 0.946827, 0.949527, 0.952091, 0.954524,
0.956833,
0.959025, 0.961106, 0.963081, 0.964956, 0.966736, 0.968425, 0.970028,
0.971550,
0.972995, 0.974367, 0.975668, 0.976904, 0.978077, 0.979190, 0.980247,
0.981250
}
```

Initialization from previously-coded information will now be discussed. As described in U.S. patent application Ser. Nos. 15/166,153, 15/166,132, and 15/166,144, all filed 26 May 2016, it is proposed to inherit (e.g., copy) the context information after coding or decoding one block located in a previously coded picture as the initialized context information for coding current slice. To be more specific, the following may apply. Suppose one picture is coded with one slice, the following rules are applied to derive the initialized states of context models. First, the previously coded picture includes a slice with the slice type that is the same as current slice type. In other examples, the initialized slice QP (Quantization Parameter) is the same as that used in current slice. Second, the states after coding one block with pre-defined address in the previously coded picture are recorded and used as the initialized states of current slice.

Denote the largest coding unit size (LCU) by N×N, and the picture width by W and picture height by H. The number of LCUs within one LCU row, denoted by PicWInCtbsY, is equal to Ceil(W÷N), and the number of LCU rows, denoted by PicHInCtbsY, is equal to Ceil(H÷N) wherein the function Ceil (x) returns the smallest integer greater than or equal to x. In one example, the address of the LCU is defined as:

$$\text{TargetCUAddr}=(\text{PicWInCtbsY}*\text{PicHInCtbsY})/2+ \text{PicWInCtbsY}/2 \quad (14)$$

Furthermore, when TargetCUAddr is equal to or larger than (PicWInCtbsY*PicHInCtbsY), (e.g., PicHInCtbsY is equal to 1), TargetCUAddr is reset to (PicWInCtbsY*PicHInCtbsY−1), which is corresponding to the last LCU in one picture.

Figure 4:
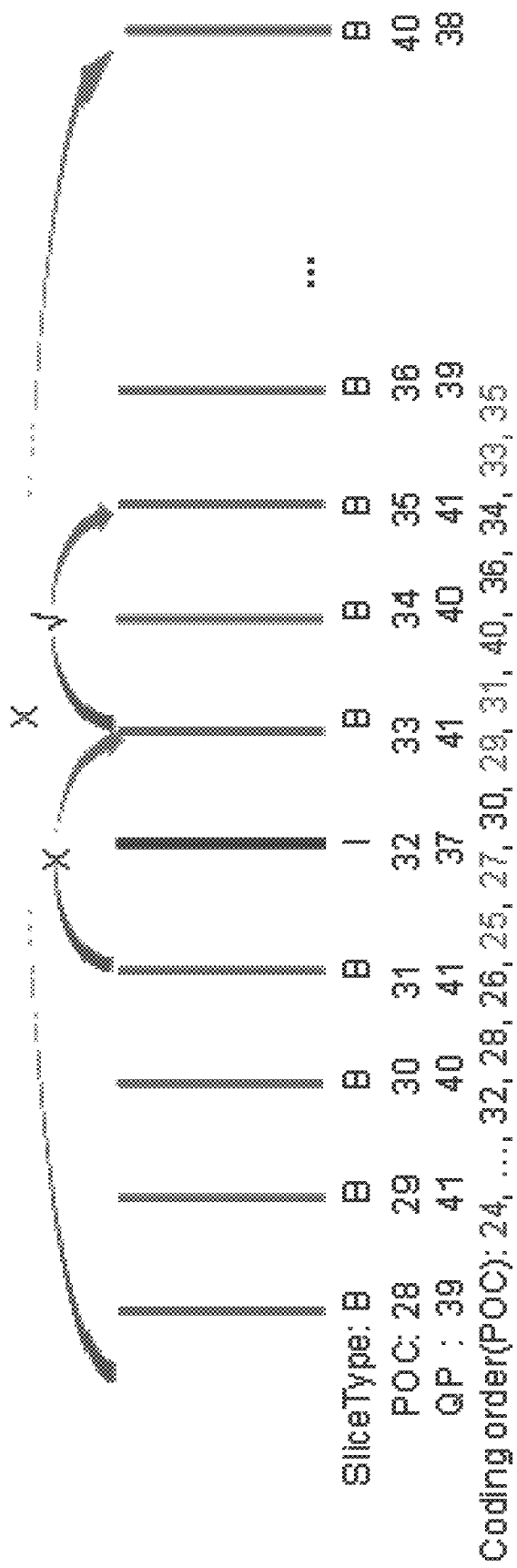
FIG. 4 shows an example of a coding order for a sequence of pictures.

In one example, furthermore, there is no need to apply the above method for the first several pictures (a new slice type or a new QP firstly appeared) after a new intra-coded picture in display order. This is to avoid the issues for random access. FIG. 4 shows an example of a coding order. For example, as shown in FIG. 4, the coding/decoding order for pictures with Picture Order Count (POC) from 28 to 35 is: 32, 28, . . . , 30, 29, 31, 40, 36, 34, 33, 35. In the display order, the picture with POC equal to 40 is the first picture that is decoded after the I-picture with POC equal to 32. Although the picture with POC equal to 24 has the same QP as the picture with POC equal to 40 and same slice types, prediction using the coded information of the picture with POC equal to 24 is disallowed. Similarly, predicting the picture with POC equal to 33 using the coded information of the picture with POC equal to 31 is also disallowed. Predicting the picture with POC equal to 35 using the coded information of the picture with POC equal to 33 since both of them will be displayed after the I-picture. When the prediction from previously coded picture is disallowed, the initialization method, as defined in HEVC, may be applied.

Aspects of a geometry-transformation based adaptive loop filter (GALF) will now be introduced. The idea of GALF was presented in U.S. Provisional Patent Application 62/324,776, filed 19 Apr. 2016, the entire content of which is hereby incorporated by reference. A corresponding proposal JVET-00038 has been adopted by JEM. In GALF, one of the three filter supports for signaling filter coefficients may be used for each slice. The three filter supports in 5×5/7×7/9×9 diamond shapes are all symmetric. Therefore, only partial of the coefficients need to be signaled. For example, for N×N diamond symmetric filter support, the total number of filter coefficients to be signaled could be defined as TotalCoeff which is equal to (N×N/4+1). Denote the filter coefficient by $C_i$, the summarization of coefficients should satisfy the follow equation:

$$C_{TotalCoef-1} + \sum_{k=0}^{TotalCoeff-2} (2+C_k) = 2^{BD} \quad ((15))$$

wherein BD indicates the bit-depth of filter coefficient.

Figures 5A, 5B, 5C:
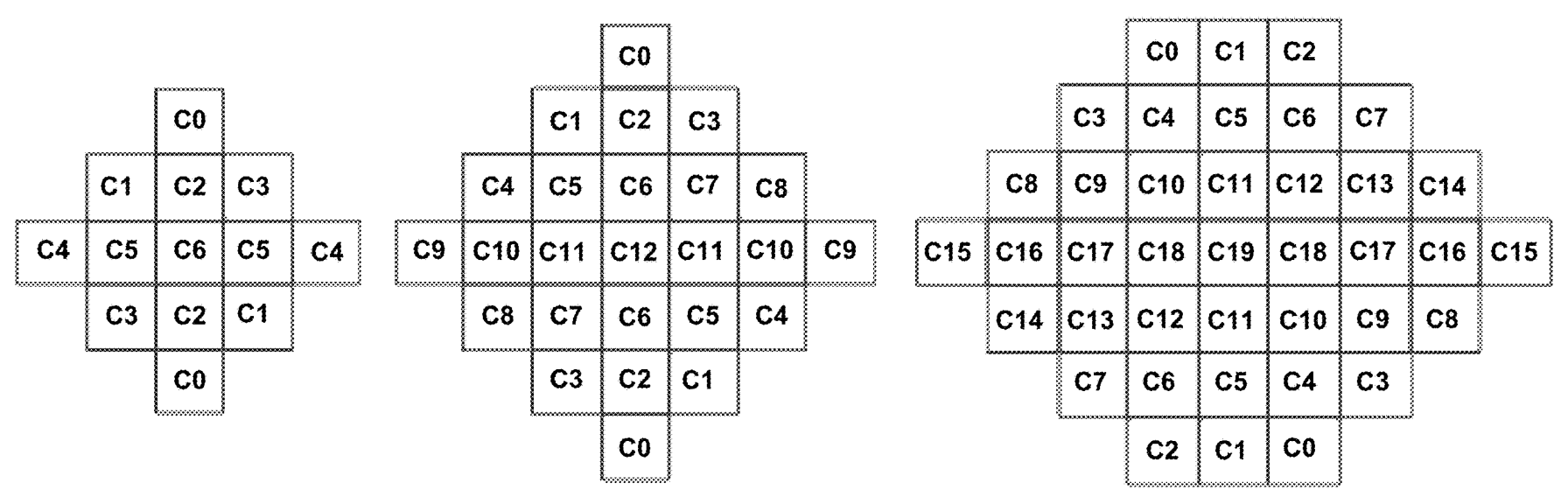

FIG. 5A shows an example of a 5×5 diamond ALF filter support. FIG. 5B shows an example of a 7×7 diamond ALF filter support. FIG. 5C shows an example of a 9×9 diamond ALF filter support.

In GALF, prediction from fixed filters may be enabled for coding ALF filter coefficients. For each of the 25 groups (5 direction*5 activity), one of the sixteen filters may be chosen as the predictor. Once a fixed filter is chosen as predictor, the differences between the real filter and the selected fixed filter are signaled.

An example of fixed filters are:
Int
m_ALFfilterCoeffFixed
[m_NO_FILTERS*JVET_C0038_NO_
PREV_FILTERS][21]={
{0, −6, 3, −6, −8, −2, 7, 0, −5, −10, −1, 28, 64, 36, 4, −2, −1, 7, 15, 68, 130}, {−6, −5, 6, −4, −5, 1, 10, 4, 3, −7, 4, 24, 53, 34, 11, 2, −9, 8, 20, 61, 102}, {−8, −10, 13, −4, −13, 12, 19, 14, 0, −11, 15, 24, 38, 31, 20, 7, −9, 19, 27, 42, 60}, {4, 8, −21, 11, 0, −18, −1, −21, −1, 9, −14, 32, 83, 37, −12, 12, 8, −28, −3, 86, 170}, {−13, −6, 19, 0, −7, 16, 16, 19, 14, −8, 17, 16, 23, 25, 25, 18, −11, 25, 25, 27, 32}, {−17, 1, 17, 13, 5, 13, 9, 10, 40, −3, 19, 15, 13, 14, 17, 37, −14, 18, 18, 21, 20}, {13, −7, −1, −1, 22, −24, −2, −32, 28, −5, −26, 7, 88, 9, −34, 2, 18, −3, −5, 94, 230}, {−1, −2, 3, 2, −2, 6, −4, −7, 1, −1, 8, −23, 20, −1, 0, 0, −3, 11, −29, 61, 434},
. . .
};
wherein m_NO_FILTERS is equal to 25 and JVET_C0038_NO_PREV_FILTERS is equal to 16. In above examples, BD is equal to 9.

In the decoder the decoded filter coefficients f (k, l) are applied to the reconstructed image R(i, j) as follows $$\tilde{R}(i,j) = \sum_{k=-K}^{K}\sum_{l=-K}^{K} f(k,l)R(i+k, j+l)/\sum_{k=-K}^{K}\sum_{l=-K}^{K} f(k,l), \quad (16)$$

where i and j are the coordinates of the pixels within the frame.

Aspects of inter prediction and motion compression will now be described. Particularly, inter prediction and motion compression as implemented in HEVC will now be described. For each block, a set of motion information can be available. The set of motion information contains motion information for forward and backward prediction directions. Here forward and backward prediction directions are two prediction directions corresponding to reference picture list 0 (RefPicList0) and reference picture list 1 (RefPicList1) of a current picture or slice. The terms "forward" and "backward" do not necessarily have a geometric meaning. Instead, these terms are used to distinguish which reference picture list a motion vector is based on. Forward prediction means the prediction formed based on reference list 0, while backward prediction means the prediction formed based on reference list 1. Bi-directional prediction is the case where both reference list 0 and reference list 1 are used to form a prediction for a given block.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g. RefPicList0 or RefPicList1). A motion vector has both a horizontal and a vertical component, with each indicating an offset value along horizontal and vertical direction respectively. In some descriptions, for simplicity, the word of "motion vector" may be used interchangeably with motion information, to indicate both the motion vector and its associated reference index.

Aspects of motion prediction in HEVC will now be described. In HEVC, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

Figure 6B:
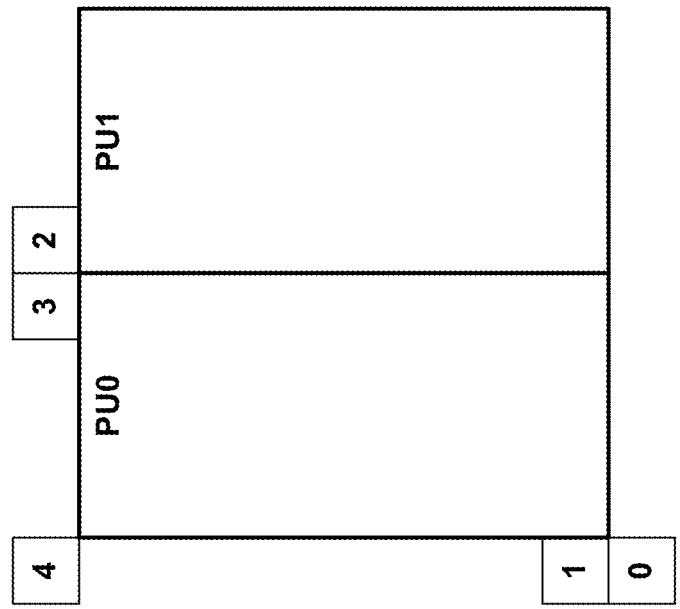
FIG. 6B shows an example of spatial neighboring MV candidates for an advanced motion vector prediction (AMVP) mode.
Figure 6A:
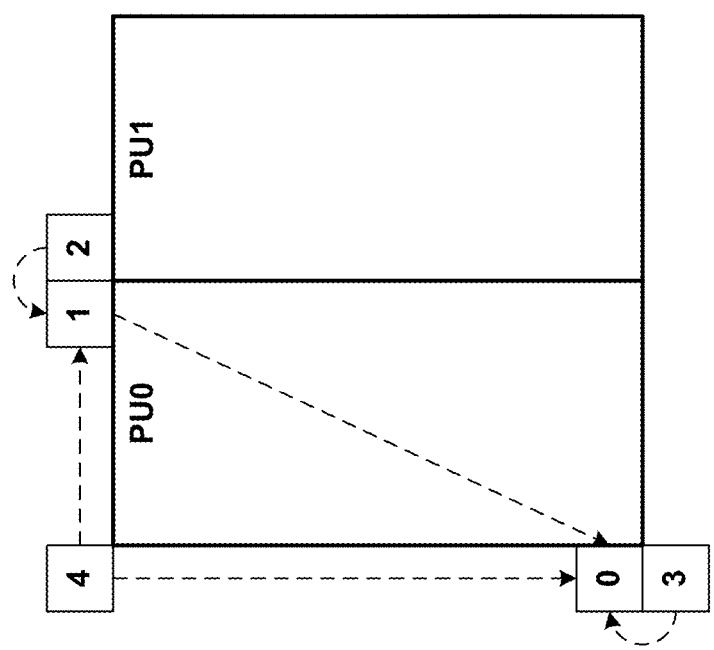
FIG. 6A shows an example of spatial neighboring motion vector (MV) candidates for a merge mode.

FIGS. 6A and 6B are conceptual diagrams illustrating spatial neighboring candidates in HEVC. In some examples, video encoder 20 and/or video decoder 30 may derive spatial motion vector (MV) candidates from the neighboring block 0, neighboring block 1, neighboring block 2, neighboring block 3 or neighboring block 4 for PU0.

In some instances, the techniques for generating the MV candidates from the blocks differ for merge and AMVP modes. FIG. 6A illustrates one example for merge mode. For example, in HEVC, a video coder (e.g., such as video encoder 20 and/or video decoder 30 of FIGS. 1-3) may derive up to four spatial MV candidates. The candidates may be included in a candidate list having a particular order. In one example, the order for the example of FIG. 6A may be neighboring block 0 (A1), neighboring block 1 (B1), neighboring block 2 (B0), neighboring block 3 (A0) and neighboring block 4 (B2).

FIG. 6B illustrates one example for AMVP mode. For example, in HEVC, the video coder may divide neighboring blocks into two groups: left group including of the neighboring block 0 and neighboring block 1, and above group including neighboring block 2, neighboring block 3, and neighboring block 4. For each group, the potential motion vector candidate associated with a neighboring block referring to the same reference picture as that indicated by the signaled reference index (for the block currently being coded) may have the highest priority to be chosen to form a final candidate of the group. It is possible that none of the neighboring block contain a motion vector pointing to the same reference picture. Therefore, if such a candidate cannot be found, the video coder may scale the first available candidate to form the final candidate, thus the temporal distance differences may be compensated.

Motion vector candidates, such as the motion vectors associated with the neighboring blocks shown in FIGS. 6A and 6B may be used to derive a motion vector for a block. For example, the video coder may generate a candidate list that includes motion vector candidates from the neighboring blocks shown in FIGS. 6A and 6B. In this example, the video coder may use one or more of the candidates of the candidate list as an initial motion vector in a motion information derivation process (e.g., bilateral matching, template matching, or the like). The video coder may apply one or more of the motion vector candidates in a motion search of a motion vector derivation process to identify reference data. The video coder may select the candidate from the list that identifies closely matching reference data. For example, the video coder may perform a motion search for a first set of reference data that corresponds to a second set of reference data outside of the current block. The video coder may, in some instances, further refine the candidate, e.g., by performing an additional motion search in an area indicated by the selected candidate, to determine a derived motion vector using the motion information derivation process.

Figure 7A:
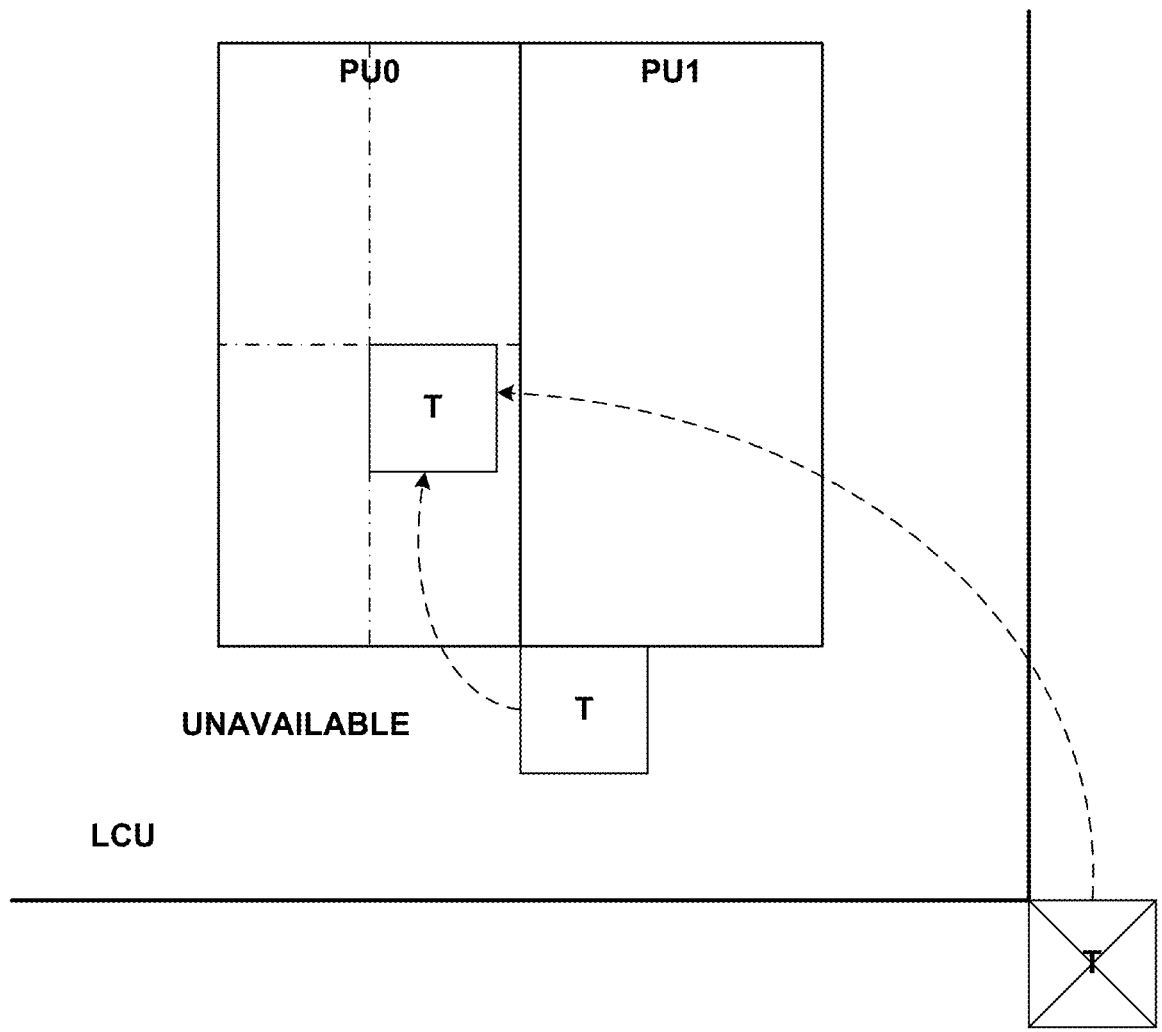
FIG. 7A shows an example of a temporal motion vector predictor (TMVP) candidate.
Figure 7B:
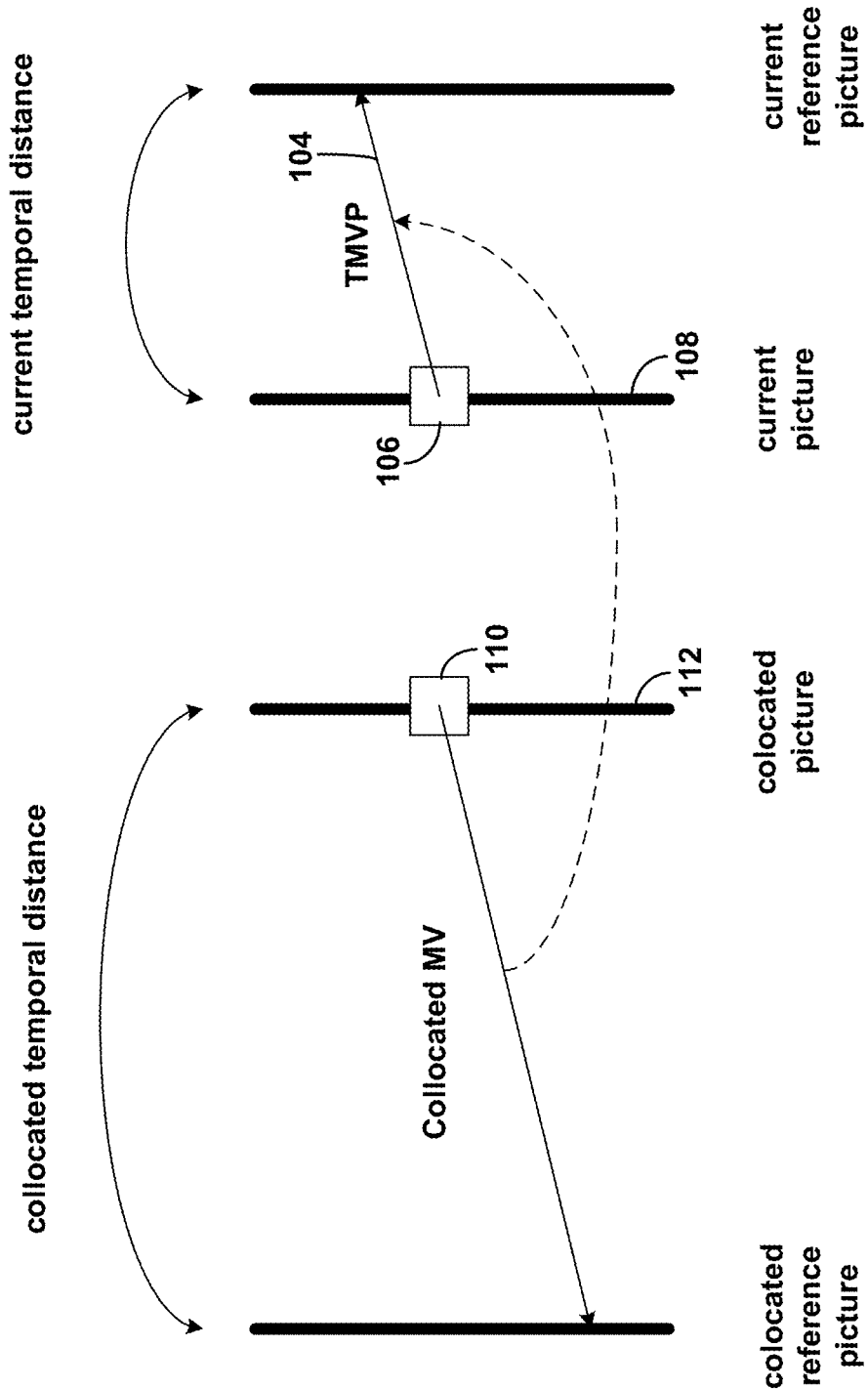
FIG. 7B shows an example of MV scaling.

FIGS. 7A and 7B are conceptual diagrams illustrating temporal motion vector prediction in HEVC. A temporal motion vector predictor (TMVP) candidate, if enabled and available, is added into a MV candidate list after spatial motion vector candidates. In HEVC, the process of motion vector derivation for a TMVP candidate is the same for both merge and AMVP modes, however, the target reference index for the TMVP candidate in the merge mode is typically set to zero.

FIG. 7A illustrates a primary block location (shown as block "T") for a TMVP candidate, which is the bottom right block outside of the collocated PU. The location may compensate for the bias to the above and left blocks used to generate spatial neighboring candidates. However, if block T is located outside of the current CTB row or motion information is not available, the block is substituted with a center block of the PU, as illustrated by the dashed arrows from block T in FIG. 7A.

FIG. 7B illustrates deriving a TMVP candidate 104 for a current block 86 of a current picture 108 from a co-located PU 110 of a co-located picture 112, as indicated at the slice level (e.g., in a slice header). Similar to temporal direct mode in AVC, a motion vector of the TMVP candidate may be subject to motion vector scaling, which is performed to compensate the distance differences, e.g., temporal distances between pictures. With respect to motion vector scaling, a video coder (such as video encoder 20 and/or video decoder 30) may be configured to initially determine that the value of motion vectors is proportional to the distance of pictures in the presentation time. A motion vector associates two pictures, the reference picture, and the picture containing the motion vector (namely, the containing picture). When a motion vector is utilized to predict the other motion vector, the distance of the containing picture and the reference picture is calculated based on the POC values.

For a motion vector to be predicted, both the associated containing picture for the motion vector and a reference picture of the motion vector may be different. Therefore, the video coder may calculate a new distance based on POC values, and the video coder may scale the motion vector based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

In some examples, a video coder may be configured to determine one or more artificial motion vector candidates. For example, if a motion vector candidate list is not complete, the video coder may generate artificial motion vector candidates and insert the artificial motion vector candidates at the end of the list until the list includes a predetermined number of entries. In merge mode, there are two types of artificial MV candidates including a combined candidate derived only for B-slices and a zero candidate. In some instances, the zero candidate is used only for AMVP if the combined type does not provide enough artificial candidates.

For each pair of candidates that are already in the candidate list and have necessary motion information, bidirectional combined motion vector candidates are derived by a combination of the motion vector of the first candidate referring to a picture in the list 0 and the motion vector of a second candidate referring to a picture in the list 1.

According to aspects of this disclosure, motion vector candidates, such as the TMVP shown in FIGS. 7A and 7B, may be used to derive a motion vector for a block. For example, the video coder may generate a candidate list that includes a TMVP determined according to process described above. In this example, the video coder may use the TMVP as an initial motion vector in a motion information derivation process (e.g., bilateral matching, template matching, or the like). The video coder may apply the TMVP in a motion vector derivation process to identify reference data. The video coder may select the TMVP in instances in which the TMVP identifies closely matching reference data. The video coder may, in some instances, further refine the TMVP to determine a derived motion vector using the motion information derivation process.

In some examples, the video coder may prune a candidate list that includes motion vector candidates (such as those described with respect to FIGS. 6A-7B). For example, in some instances, candidates from different blocks may happen to be the same, which decreases the efficiency of a merge/AMVP candidate list. The video code may apply a pruning process to solve this problem. The video coder may compare one candidate against the others in the current candidate list to avoid inserting an identical candidate. To reduce the complexity, the video coder may apply only limited numbers of pruning processes instead of comparing each potential one with all the other existing ones.

When performing motion compression, after one frame is decoded, instead of storing the motion information for each 4×4, only one set of motion information per 16×16 block is stored. The set of motion information to be stored is associated with the top-left 4×4 block of one 16×16 region.

For TMVP, the following sub-clauses of HEVC specification (JCTVC-W1005_v3.doc) are invoked to derive the TMVP candidate from the reference picture with motion compression applied:

8.5.3.2.8 Derivation Process for Temporal Luma Motion Vector Prediction

Inputs to this process are:
1. a luma location (xPb, yPb) specifying the top-left sample of the current luma prediction block relative to the top-left luma sample of the current picture,
2. two variables nPbW and nPbH specifying the width and the height of the luma prediction block,
3. a reference index refIdxLX, with X being 0 or 1.

Outputs of this process are:
4. the motion vector prediction mvLXCol,
5. the availability flag availableFlagLXCol.

The variable curbs specifies the current luma prediction block at luma location (xPb, yPb).

The variables mvLXCol and availableFlagLXCol are derived as follows:
6. If slice_temporal_mvp_enabled_flag is equal to 0, both components of mvLXCol are set equal to 0 and availableFlagLXCol is set equal to 0.

7. Otherwise (slice_temporal_mvp_enabled_flag is equal to 1), the following ordered steps apply:
The bottom right collocated motion vector is derived as follows:
xColBr=xPb+nPbW (8-200)
yColBr=yPb+nPbH (8-201)
   If yPb>>CtbLog2SizeY is equal to yColBr>>CtbLog2SizeY, yColBr is less than pic_height_in_luma_samples, and xColBr is less than pic_width_in_luma_samples, the following applies:
   The variable colPb specifies the luma prediction block covering the modified location given by ((xColBr>>4)<<4, (yColBr>>4)<<4) inside the collocated picture specified by ColPic.
   The luma location (xColPb, yColPb) is set equal to the top-left sample of the collocated luma prediction block specified by colPb relative to the top-left luma sample of the collocated picture specified by ColPic.
   The derivation process for collocated motion vectors as specified in clause 8.5.3.2.9 is invoked with currPb, colPb, (xColPb, yColPb), and refIdxLX as inputs, and the output is assigned to mvLXCol and availableFlagLXCol.
   Otherwise, both components of mvLXCol are set equal to 0 and availableFlagLXCol is set equal to 0.
   When availableFlagLXCol is equal to 0, the central collocated motion vector is derived as follows:
xColCtr=xPb+(nPbW>>1) (8-202)
yColCtr=yPb+(nPbH>>1) (8-203)
   The variable colPb specifies the luma prediction block covering the modified location given by ((xColCtr>>4)<<4, (yColCtr>>4)<<4) inside the collocated picture specified by ColPic.
   The luma location (xColPb, yColPb) is set equal to the top-left sample of the collocated luma prediction block specified by colPb relative to the top-left luma sample of the collocated picture specified by ColPic.
   The derivation process for collocated motion vectors as specified in clause 8.5.3.2.9 is invoked with currPb, colPb, (xColPb, yColPb), and refIdxLX as inputs, and the output is assigned to mvLXCol and availableFlagLXCol.

Aspects of the JEM design will now be described. In JEM, two new inter coding tools are introduced, named Advanced Temporal Motion Vector Prediction (ATMVP) and Spatial-temporal motion vector prediction (STMVP).

Figure 8:
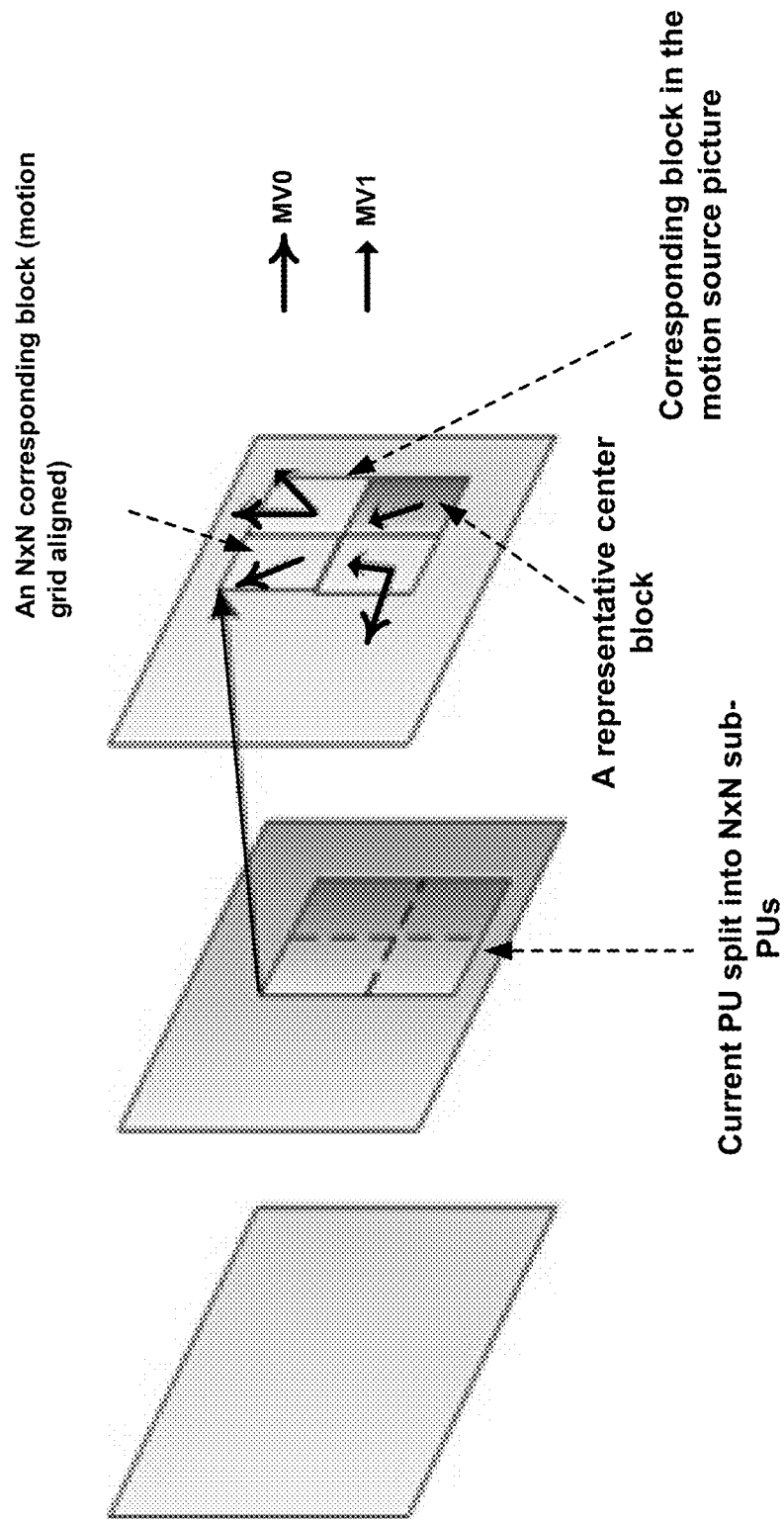
FIG. 8 shows an example of Advanced Temporal Motion Vector Prediction ATMVP motion prediction for a PU.

Advanced temporal motion vector prediction will now be described. FIG. 8 shows an example of ATMVP motion prediction for a PU. In ATMVP, the TMVP in HEVC is improved by allowing each PU to fetch multiple sets of motion information from multiple blocks smaller than the current PU. As shown in FIG. 8, the sub-PUs are square N×N blocks (N is set to e.g., 4).

The ATMVP predicts the motion vectors of the sub-PUs within a PU in two steps. The first step is to identify the corresponding block in a reference picture with a so-called temporal vector. The reference picture is called the motion source picture. The second step is to split the current PU into sub-PUs and obtain the motion information (motion vectors and the reference indices) of each sub-PU from the block corresponding to each sub-PU, as shown in FIG. 8.

In the first step, a reference picture and the corresponding block is determined by the motion information of the spatial neighbouring blocks of the current PU. To avoid the repetitive scanning process of neighboring blocks, the first merge candidate in the merge candidate list of the current PU is used. The first available motion vector as well as its associated reference index are set to be the temporal vector and the index to the motion source picture. This way, in ATMVP, the corresponding block may be more accurately identified, compared with TMVP, wherein the corresponding block (sometimes called co-located block) is always in a bottom-right or center position relative to the current PU. In other words, in TMVP, a temporal vector close to zero motion is always used while the proposed method can accommodate the local motion thus find the correlated temporal blocks more accurately.

In the second step, a corresponding block of the sub-PU is identified by the temporal vector in the motion source picture, by adding to the coordinate of the current PU the temporal vector. For each sub-PU, the motion information of its corresponding block (the smallest motion grid that covers the center pixel) is used to derive the motion information for the sub-PU. After the motion information of a corresponding N×N block is identified, it is converted to the motion vectors and reference indices of the current sub-PU, in the same way as TMVP, wherein motion scaling and other procedures apply. For example, the decoder checks whether the low-delay condition is fulfilled and possibly uses motion vector $MV_x$ (the motion vector corresponding to reference picture list X) to predict motion vector $MV_y$ (with X being equal to 0 or 1 and Y being equal to 1−X) for each sub-PU. This is done in the same way as for temporal motion vector prediction. When motion information tend to be diverged locally, the efficiency of the TMVP becomes worse since for each small PU, the average signalling cost increases. However, with the proposed ATMVP, even in this case, as long as the motion is close to uniform for each small object, even the motion vectors are not the same for small neighboring blocks, the motion vectors can be well predicted with ATMVP.

Figure 9:
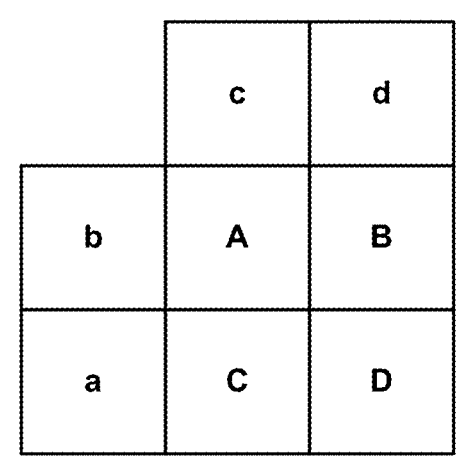

Aspects of STMVP will now be described. For STMVP, the motion vectors of the sub-PUs are derived recursively, following raster scan order. FIG. 9 illustrates this concept. Let us consider an 8×8 PU which contains four 4×4 sub-CUs A, B, C, and D. The neighbouring 4×4 blocks in the current frame are labeled as a, b, c, and d.

FIG. 9 shows an example of one CU with four sub-blocks (A-D) and its neighboring blocks (a-d). The motion derivation for sub-PU A starts by identifying its two spatial neighbours. The first neighbour is 4×4 block above sub-PU A (block c). If this block c is not available or is intra coded the other 4×4 blocks above sub-PU A are checked (from left to right, starting at block c). The second neighbour is a block to the left of the sub-PU A (block b). If block b is not available or is intra coded other blocks to the left of sub-PU A are checked (from top to bottom, staring at block b). The motion information obtained from the neighbouring blocks for each list is scaled to the first reference frame for a given list. Next, a TMVP of sub-PU A is derived by following the same procedure of TMVP derivation as specified in HEVC, i.e. the motion information of the co-located block at location D is fetched and scaled accordingly. At last, after retrieving and scaling the motion information, all available motion vectors (up to 3) are averaged separately for each reference list. The averaged motion vector is assigned as the motion vector of the current sub-PU.

The design of JEM may have several potential problems. As an example of a first problem, motion compression in the HEVC design of storing the motion information of the top-left 4×4 block of each 16×16 block is based on the assumption that a TMVP candidate prefers the bottom-right position of the co-located block in a reference picture. While in JEM, such an assumption is changed due to ATMVP or STMVP. Another example of a potential problem is that when context models are utilized by inheriting the status of context models from previously coded information, status of all context models under different slice types and different quantization parameters are stored which may increase storage complexity. Similarly, as another example of a potential problem, the fixed filters are pre-defined and stored to predict the derived filters. There could be some cases that the precision (bit-depth) of fixed filters is different than that used in the filtering process, and how to handle the differences of bit-depth or reduce storage complexity need to be addressed. As another potential problem, when motion information from a reference frame is required, such as TMVP, ATMVP or STMVP, the existing of intra-coded blocks in the reference frame may have negative impact in terms of coding efficiency.

To potentially solve the various problems mentioned above, the following techniques for memory and/or bandwidth reduction are described. The following techniques may be applied individually or in any combination.

With respect to context statuses, when context initialization from previously coded information is enabled, the stored status of context models for initializing the following slices/tiles/pictures are in lower precision than that for coding the following slices/tiles/pictures. Denote the precision of context status associated with a binary arithmetic coder by N-bits and the precision of stored context status by K-bits, wherein N and K are both positive integer values. In some examples, K may be smaller than N. In one example, K is set to N−1. Alternatively, N may be equal to 15 and K may be equal to 8.

In another example, furthermore, when the stored status for the i-th context model is used to initialize the i-th context model in current slice/tile/picture, the initialized status value is set to (the stored value<<(N−K)), wherein << denotes the left-shift operation. Alternatively, when the stored status for the i-th context model is used to initialize the i-th context model in current slice/tile/picture, the initialized status value is set to ((the stored value<<(N−K))+offset. In one example, the offset is set equal to 1<<(N−K−1) or (1<<(N−K−1))−1. In another example, the mapping relationship of initialized status values and stored status values can be pre-defined, or even signaled in the bit stream. In one example, a piece-wise linear mapping is used to convert stored status values to initialized status values.

The above techniques may also be applied to context-based variable length coding wherein the status of previously coded context models could be inherited by the initialized status of current slice/tile/picture.

The following techniques relate to ALF fixed filters:
1. In GALF and other tools for in-loop filtering, when prediction from fixed filters is applied, the precision (bit-depth) of fixed filters and derived filters for filtering current slice/tile/picture may be different.
 a. In one example, the precision of fixed filters may be lower than that used for interpolation.
 b. Denote the precision of derived filter by N-bits and the precision of fixed filter by K-bits, wherein N and K are both positive integer values. In one example, K is smaller than N.
 c. In another example, furthermore, when the fixed filter is used as a predictor, the difference between the derived filter coefficient and the coefficient of a selected fixed filter after shifting may be signaled. For example, the predictor is defined as (coefficient of a fixed filter<<(N−K)) wherein N and K are defined in bullet 1 b). Alternatively, the predictor is defined as ((coefficient of a fixed filter<<(N−K))+offset). In one example, the offset is equal to 1<<(N−K−1) or (1<<(N−K−1))−1. Additionally, the offset for one of the coefficients of the filter predictor is adjusted so that the sum of the all coefficients of the filter predictor is equal to (1<<N).
 d. In another example, furthermore, the precision of stored ALF parameters used for filtering succeeding frames may be different from that of fixed filters.

In the above itemized techniques, the precision denoted by N or K may be pre-defined. In another example, N or K or (N−K) may be signalled in video parameter sets (VPSs)/sequence parameter sets (SPSs)/picture parameter sets (PPSs)/slice header/adaptation parameter sets (APSs), to name a few.

The following techniques relate to motion compression. It is proposed that when motion compression is applied, instead of always storing the motion information of the top-left 4×4 block, the following may be applied:
All blocks within one M×N block (for example, M and N are both equal to 16) share the same motion information after one slice/picture is coded/decoded.
[1] In one example, the most frequently used motion information in terms of occurring counts within an M×N block is stored.
 a. Alternatively, furthermore, the first or last most frequently used motion information in a given order is defined as the motion information shared by the largest area within the M×N block.
[2] In another example, the motion of the largest non-subblock inter block (e.g., a prediction unit/coding unit/transform unit) within the M×N block is stored.
 a. If there are two or more same-size largest non-subblock inter blocks, the motion of the first/last one is stored.
[3] Motion information associated with different inter modes may be given different priorities.
 a. In one example, the motion information for a block coded with local illumination compensation may be set to be with a lower priority.
 b. In one example, the motion information for a block coded with affine mode may be set to be with a lower priority.
 c. In one example, the motion information for a block coded with AMVP mode, and/or FRUC mode may be set to be with a higher priority.
 d. When multiple sets of motion information are pre-selected according to bullet #1 or #2, one of them will be stored which depends on the priority.
[4] In another example, motion information to be stored for an M×N block may be derived instead of directly copying one set of selected motion information.
 a. In one example, motion information of one/more inter-coded blocks within the M×N block may be used to derive that for storage.
 b. In one example, selected motion vectors of the M×N block are weighted to derive the motion information to be stored. Alternatively, furthermore, the selected motion vectors are from the same reference pictures.
 c. In another example, furthermore, the weighting may depend on the size of the block to which the motion is associated.
 d. Template matching or bilateral matching such as those used in FRUC method may be used to derive the motion vector. Examples are described in U.S. patent application Ser. Nos. 15/080,479, 15/080,478, and 15/080,480, filed 24 Mar. 2016.
 e. If a block is intra coded, its motion vector may be derived by motion field inpainting from neighboring motion vectors.

f. In another example, furthermore, the above methods may not only be used in MV compression, but may also be used to determine motion information for the M×N block or an intra-coded sub-block within a M×N block so that temporal motion prediction in succeeding frames may benefit from this.

[5] In another example, different motion compression methods (i.e., in terms of how to select the motion information to be stored within an M×N block) may be applied.

[6] In another example, the unit for motion storage may be adaptively changed.

[7] In another example, the unit and/or compression method for motion storage may dependent on whether certain coding tool(s) is enabled or disabled. In another example, the unit and/or compression method for motion storage may depend on whether one slice/tile/picture will be referred by other pictures or not. In another example, the unit and/or compression method for motion storage may depend on the Temporal Identifier.

[8] Before and/or after MV compression, the motion field may be smoothed or filtered to remove/avoid the negative impact by outlier or incorrect motion when applying motion vector temporal prediction.

For all cases that need to store pre-defined parameters or intermediate data, the above individual techniques are not limited to each corresponding coding tool. The described techniques can also be applied to all the cases that need store pre-defined parameters or intermediate data.

Video encoder 20 and video decoder 30, which will be described in more detail below, represent examples video coders that may process video data according to any technique or combination of techniques described herein. In one example, video encoder 20 or video decoder 30 may, for example, code a first sub-block of an M×N block using first motion information, code a second sub-block of the M×N block using second motion information that is different than the first motion information, and for the M×N block, store for use in coding subsequent blocks or frames only one of the first motion information or the second motion information.

In another example, video encoder 20 or video decoder 30 may, for example, store one or more context statuses associated with a binary arithmetic coder at a bit depth of K for one or more blocks of the video data and code the one or more blocks of the video data located in a different frame with an N-bit binary arithmetic coder. In this example, N and K are both positive integer values, and K is smaller than N. Video encoder 20 or video decoder 30 may set an initialized status value for an i-th context model for the one or more blocks of the video data to a stored value<<(N−K)) and initialize the i-th context. In this example, "<<" denotes a left-shift operation, and "i" represents an identifier, such as an index, of a context. Video encoder 20 or video decoder 30 may also map a stored status value to an initialized status value for an i-th context model based on a mapping of stored status values to initialized status values and initialize the i-th context. The mapping may, for example, be one or more of pre-defined, signaled in a bit stream, or a piece-wise linear mapping. The one or more blocks of the video data may, for example, be one or more of a slice, a tile, or a picture. In some examples, K may equal N−1, while in other examples, N may equal 15, and K may equal 8.

According to another example, video encoder 20 or video decoder 30 may, for example, determine a set of one or more fixed filters with K-bit precision and determine a set of one or more derived filters with N-bit precision. In this example, K is less than N. To determine the set of one or more derived filters with N-bit precision, video encoder 20 or video decoder 30 may predict the set of one or more derived filters from the set of one or more fixed filters. Video encoder 20 or video decoder 30 may, for example, determine a prediction value that corresponds to a coefficient of a fixed filter<<(N−K)) and determine a difference between the prediction value and a value of a derived filter coefficient. Video encoder 20 or video decoder 30 may determine a prediction value that corresponds to a coefficient of a fixed filter<<(N−K)+offset) and determine a difference between the prediction value and a value of a derived filter coefficient. The offset may, for example, equal one of 1<<(N−K−1) or (1<<(N−K−1))−1. The difference between the prediction value and a value of a derived filter coefficient may be transmitted to the decoder.

Figure 10:
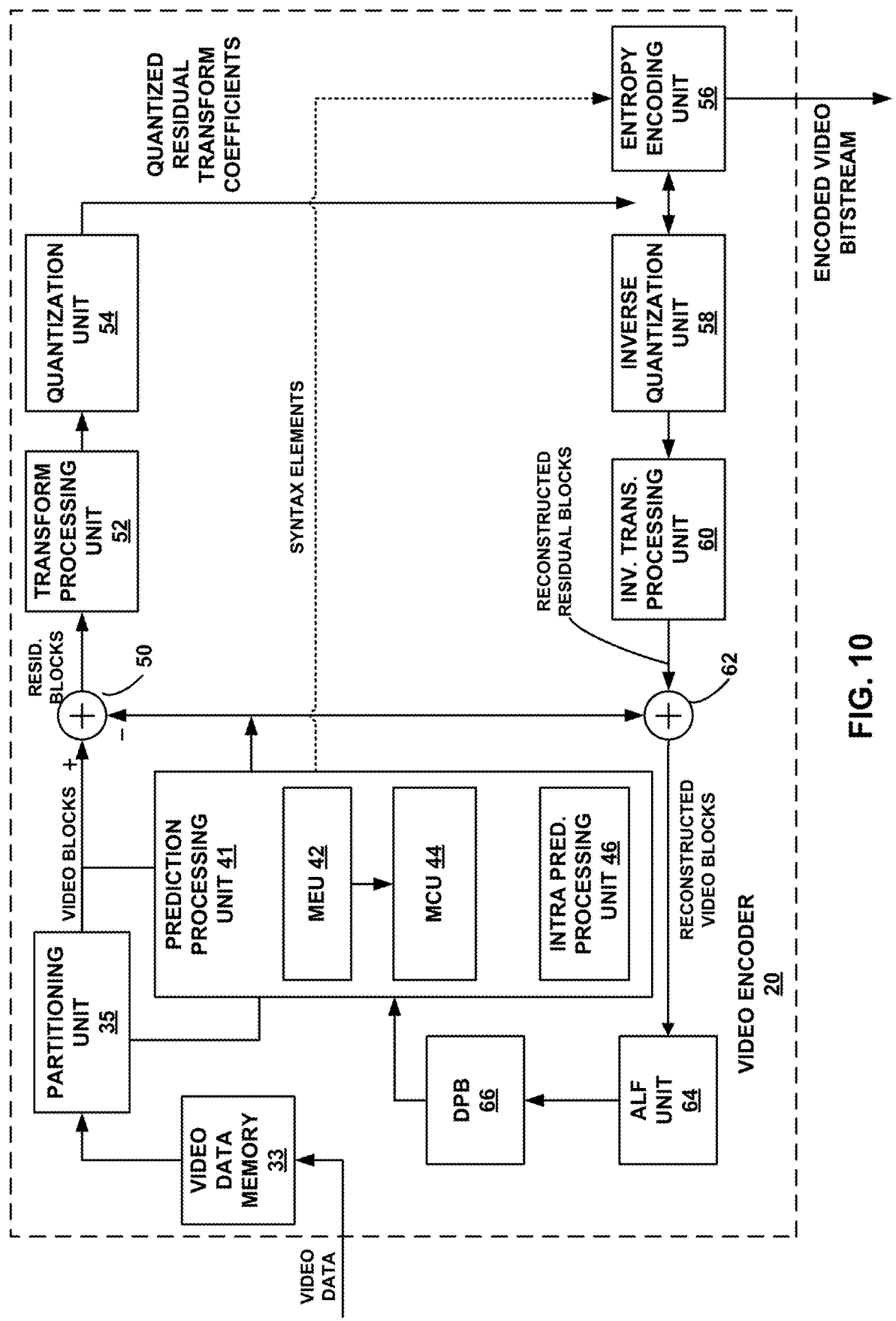
FIG. 10 is a block diagram illustrating an example video encoder that may implement the techniques described in this disclosure.

FIG. 10 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 10, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, ALF unit 64, and decoded picture buffer (DPB) 66.

As shown in FIG. 10, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), CABAC, syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

ALF unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 10, video encoder 20 may include additional filters such as a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 11:
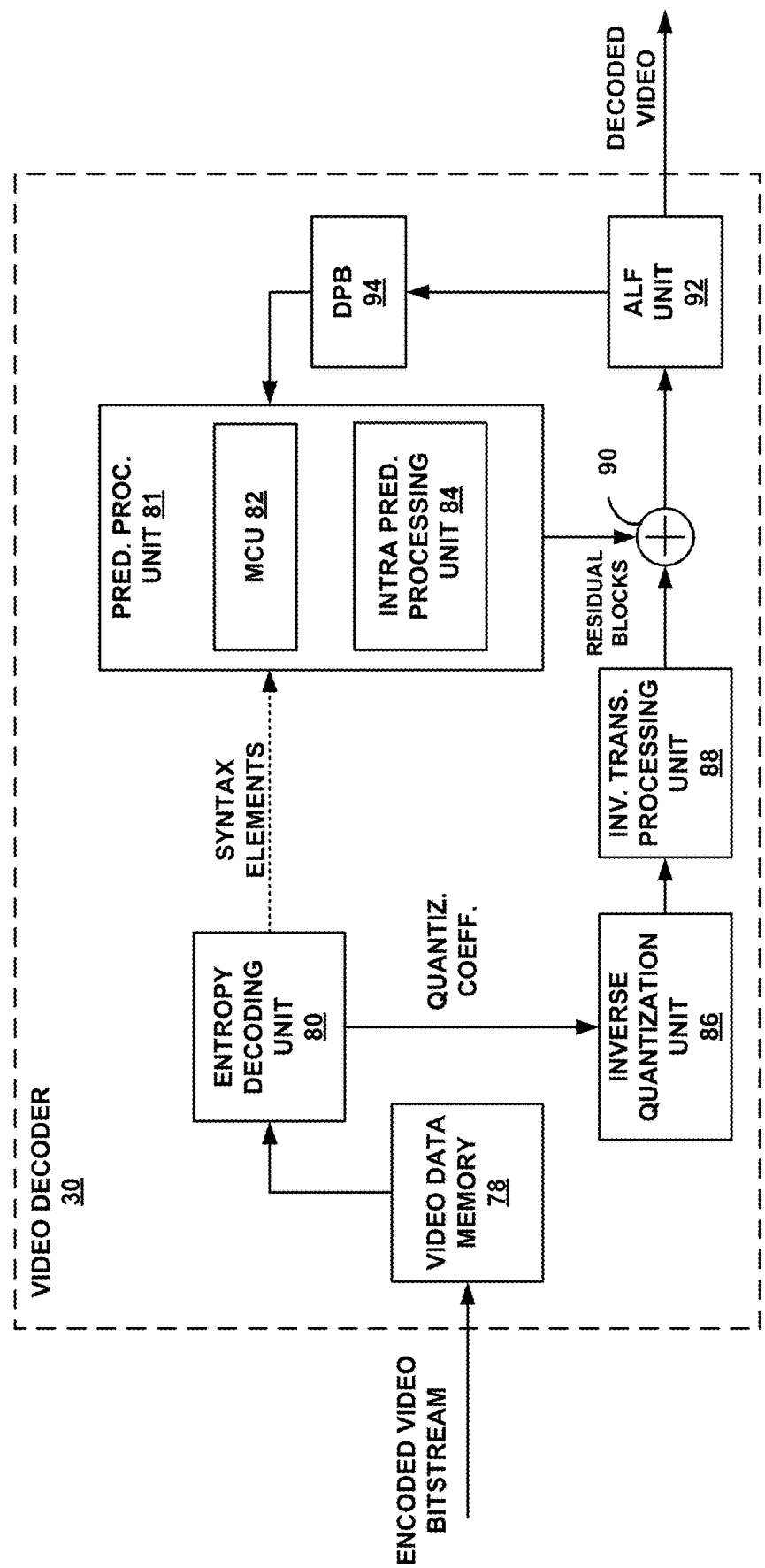
FIG. 11 is a block diagram illustrating an example video decoder that may implement the techniques described in this disclosure.

FIG. 11 is a block diagram illustrating an example video decoder 30 that may implement the techniques described in this disclosure. Video decoder 30 of FIG. 11 may, for example, be configured to receive the signaling described above with respect to video encoder 20 of FIG. 10. In the example of FIG. 11, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 10.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. ALF unit 92 filters the reconstructed video block using, for example, one or more of the ALF techniques described in this disclosure.

Although not explicitly shown in FIG. 10, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

Figure 12:
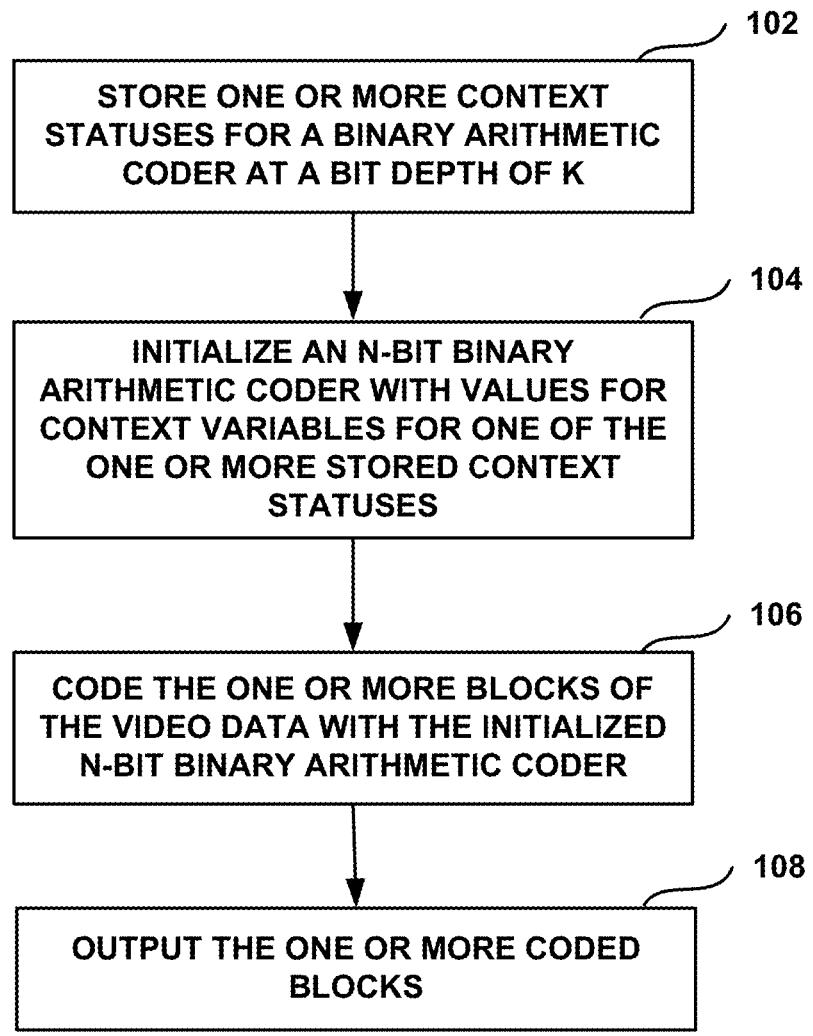
FIG. 12 is a flow diagram illustrating an example video coding technique described in this disclosure.

FIG. 12 is a flow diagram illustrating an example video coding technique described in this disclosure. The techniques of FIG. 12 will be described with reference to a generic video coder, which may, for example, correspond to a video decoder, such as video decoder 30, or to a video encoder, such as video encoder 20. In the example of FIG. 12, the video coder stores one or more context statuses for a binary arithmetic coder at a bit depth of K (102). Each context status of the one or more context statuses may include values for context variables, and the one or more context statuses may be associated with one or more previously coded blocks. The video coder initializes an N-bit binary arithmetic coder with values for context variables for one of the one or more stored context statuses (104). For example, the video coder may set an initialized status value for an i-th context model for the one or more blocks of the video data to a stored value<<(N−K)), wherein << denotes a left-shift operation and initialize the i-th context. In another example, the video coder may map a stored status value to an initialized status value for an i-th context model based on a mapping of stored status values to initialized status values and initialize the i-th context. The mapping may, for example, be one or more of pre-defined, signaled in a bit stream, or a piece-wise linear mapping.

The video coder codes the one or more blocks of the video data with the initialized N-bit binary arithmetic coder (106). N and K are both positive integer values, and K is smaller than N. In some examples, N equals 15, and K equals 8. In other examples, K equals N−1, while in other examples, K and N have other values. The N-bit binary arithmetic coder may, for example, be an N-bit CABAC coder. The one or more blocks of the video data may, for example, be any of a slice, a tile, or a picture, or some other grouping of blocks.

The video coder outputs the one or more coded blocks (108). In examples, where the video coder is a video encoder, the video encoder may output the one or more coded blocks, for example, by saving a picture that includes the one or more coded blocks in a coded picture buffer or by generating a bitstream of encoded video data that includes block data for the one or more coded blocks. In examples, where the video coder is a video decoder, the video decoder may output the one or more coded blocks, for example, by saving a picture that includes the one or more coded blocks in a coded picture buffer or by transmitting to a display the picture that includes the one or more coded blocks.

In examples where the video coder is a video decoder, then the video decoder may code the one or more blocks of the video data with an N-bit binary arithmetic coder by decoding the one or more blocks of the video data with an N-bit binary arithmetic decoder. The video decoder may also, in conjunction with decoding video data, receive the video data at a receiver of a wireless communication device, store the video data in a memory of the wireless communication device, and process the video data on one or more processors of the wireless communication device. In examples where the video coder is a video encoder, then the video encoder may code the one or more blocks of the video data with an N-bit binary arithmetic coder by encoding the one or more blocks of the video data with an N-bit binary arithmetic encoder. The video encoder may also, in conjunction with encoding video data, store the video data in a memory of a wireless communication device, process the video data on one or more processors of the wireless communication device, and transmit the video data from a transmitter of the wireless communication device.

Figure 13:
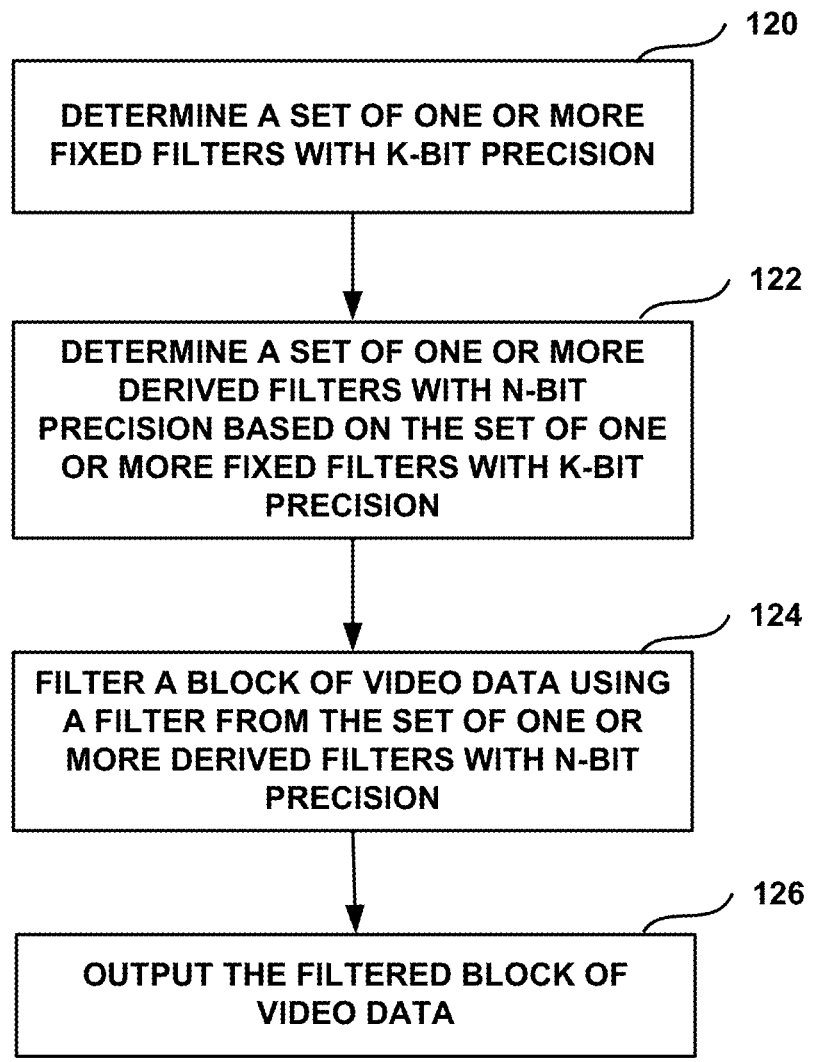
FIG. 13 is a flow diagram illustrating an example video coding technique described in this disclosure.

FIG. 13 is a flow diagram illustrating an example video coding technique described in this disclosure. The techniques of FIG. 13 will be described with reference to a generic video coder, which may, for example, correspond to a video decoder, such as video decoder 30, or to a video encoder, such as video encoder 20. In the example of FIG. 13, the video coder determines a set of one or more fixed filters with K-bit precision (120). The video coder determines a set of one or more derived filters with N-bit precision based on the set of one or more fixed filters with K-bit precision (122). K and N are integers, and K is less than N.

To determine the set of one or more derived filters with N-bit precision, the video coder may, for example, predict the set of one or more derived filters from the set of one or more fixed filters. The video coder may, for example, determine a prediction value, wherein the prediction value corresponds to a coefficient of a fixed filter<<(N−K)) and determine a difference between the prediction value and a value of a derived filter coefficient. The video coder may, for examples, determine a prediction value that corresponds to a coefficient of a fixed filter<<(N−K)+offset) and determine a difference between the prediction value and a value of a derived filter coefficient. The offset may, for example, be equal to one of 1<<(N−K−1) or (1<<(N−K−1))−1.

The video coder filters a block of video data using a filter from the set of one or more derived filters with N-bit precision (124). The video coder may, for example, filter the block using the ALF or GALF techniques described in this disclosure or using some other loop filtering technique. The video coder outputs the filtered block of video data (126). In examples, where the video coder is a video encoder, the video encoder may output the filtered blocks, for example, by saving a picture that includes the filtered blocks in a coded picture buffer or by generating a bitstream of encoded video data that includes block data for the filtered blocks. In examples, where the video coder is a video decoder, the video decoder may output the filtered blocks, for example, by saving a picture that includes the filtered blocks in a coded picture buffer or by transmitting to a display the picture that includes the filtered blocks.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for processing video data, the method comprising:
   storing one or more context statuses for a binary arithmetic coder at a bit depth of K, wherein each context status of the one or more context statuses comprises values for context variables, and wherein the one or more context statuses are associated with one or more previously coded blocks;
   initializing an N-bit binary arithmetic coder with values for context variables for the one of the one or more stored context statuses;
      retrieving a value for one of the one more context statuses, wherein the value has the bit depth of K;
      setting an initialized status value for an i-th context model for the one or more blocks of the video data to the value <<(N−K)), wherein << denotes a left-shift operation; and
      initializing the i-th context;
   coding the one or more blocks of the video data with the initialized N-bit binary arithmetic coder, wherein N and K are both positive integer values, and wherein K is smaller than N; and
   outputting the one or more coded blocks.

2. The method of claim 1, wherein the one or more blocks of the video data comprise one or more of a slice, a tile, or a picture.

3. The method of claim 1, wherein K equals N−1.

4. The method of claim 1, wherein N equals 15 and K equals 8.

5. The method of claim 1, wherein the N-bit binary arithmetic coder comprises an N-bit context adaptive binary arithmetic coder.

6. The method of claim 1, wherein coding the one or more blocks of the video data with an N-bit binary arithmetic coder comprises decoding the one or more blocks of the video data with an N-bit binary arithmetic decoder, the method further comprising:
   receiving the video data at a receiver of a wireless communication device;
   storing the video data in a memory of the wireless communication device; and
   processing the video data on one or more processors of the wireless communication device.

7. The method of claim 1, wherein coding the one or more blocks of the video data with an N-bit binary arithmetic coder comprises encoding the one or more blocks of the video data with an N-bit binary arithmetic encoder, the method further comprising:
   storing the video data in a memory of a wireless communication device;
   processing the video data on one or more processors of the wireless communication device; and
   transmitting the video data from a transmitter of the wireless communication device.

8. A device for processing video data, the device comprising:
   a memory configured to store:
      the video data; and
      one or more context statuses for a binary arithmetic coder at a bit depth of K, wherein each context status of the one or more context statuses comprises values for context variables, and wherein the one or more context statuses are associated with one or more previously coded blocks of the video data;
   one or more processors configured to:
      initialize an N-bit binary arithmetic coder with values for context variables for one of the one or more stored context statuses, wherein to initialize the N-bit binary arithmetic coder with values for context variables for one of the one or more stored context statuses, the one or more processors are configured to:
         retrieve a value for one of the one more context statuses, wherein the value has the bit depth of K;
         set an initialized status value for an i-th context model for the one or more blocks of the video data to the value <<(N−K)), wherein << denotes a left-shift operation; and
         initialize the i-th context;
      code the one or more blocks of the video data with the initialized N-bit binary arithmetic coder, wherein N and K are both positive integer values, and wherein K is smaller than N; and
      output the one or more coded blocks.

9. The device of claim 8, wherein the one or more blocks of the video data comprise one or more of a slice, a tile, or a picture.

10. The device of claim 8, wherein K equals N−1.

11. The device of claim 8, wherein N equals 15 and K equals 8.

12. The device of claim 8, wherein the N-bit binary arithmetic coder comprises an N-bit context adaptive binary arithmetic coder.

13. The device of claim 8, wherein the device comprises a video encoding device and further comprises a transmitter configured to wirelessly transmit encoded video data.

14. The device of claim 8, wherein the device comprises a video decoding device and further comprises a receiver configured to wirelessly receive encoded video data.

* * * * *